US009572042B2

(12) United States Patent
Steer et al.

(10) Patent No.: US 9,572,042 B2
(45) **Date of Patent: *Feb. 14, 2017**

(54) SPECTRUM CHANNEL SHARING SYSTEM

(71) Applicant: BlackBerry Limited, Waterloo (CA)

(72) Inventors: David Gywn Steer, Nepean (CA); Sophie Vrzic, Kanata (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/992,810

(22) Filed: Jan. 11, 2016

(65) Prior Publication Data

US 2016/0127915 A1 May 5, 2016

Related U.S. Application Data

(63) Continuation of application No. 13/827,699, filed on Mar. 14, 2013, now Pat. No. 9,237,453.

(51) Int. Cl.
*H04W 16/14* (2009.01)
*H04W 76/06* (2009.01)

(52) U.S. Cl.
CPC ........... *H04W 16/14* (2013.01); *H04W 76/066* (2013.01)

(58) Field of Classification Search
CPC ........................... H04W 16/14; H04W 76/066
See application file for complete search history.

(56) References Cited

U.S. PATENT DOCUMENTS 5,794,151 A 8/1998 McDonald et al.
8,363,546 B2 1/2013 Freen et al.
9,237,453 B2 * 1/2016 Steer .................. H04W 76/066
2012/0008704 A1 * 1/2012 Shetty .................. H04W 16/14 375/285
2012/0149414 A1 6/2012 Krishnaswamy et al.
2012/0314663 A1 * 12/2012 Dwivedi ........... H04W 36/0066 370/329
2013/0100814 A1 4/2013 Kennedy et al.

FOREIGN PATENT DOCUMENTS

CA 2814506 A1 4/2012
CA 2840555 A1 1/2013

OTHER PUBLICATIONS

Interdigital, "Dynamic Spectrum Management", Oct. 2012.*

(Continued)

*Primary Examiner* — Brandon Miller
(74) *Attorney, Agent, or Firm* — Conley Rose, P.C.; J. Robert Brown, Jr.

(57) ABSTRACT

A spectrum channel sharing system may coordinate a shared usage of one or more spectrum channels between a first communication system and a second communication system. The first communication system may transmit a request to the second communication system to clear communication traffic associated with the second communication system from a spectrum channel. The first communication system may then initiate a communication session on the spectrum channel after the communication traffic associated with the second communication system has been at least partially cleared from the spectrum channel.

20 Claims, 10 Drawing Sheets

(56) References Cited

OTHER PUBLICATIONS

ITU Radiocommunication Assembly; "Technical Characteristics and Performance Criteria for Radiosonde Systems in the Meteorological Aids Service"; Rec. ITU-R SA.1165-1; 1995-1997; 14 pages.
InterDigital, Inc.; "Dynamic Spectrum Management"; Oct. 2012; 14 pages.
Rysavy Research, LLC.; "Spectrum Sharing—The Promise and the Reality"; Jul. 2012; 12 pages.
ITU-R, Radiocommunication Sector of ITU, p. 1546-4, "Method for Point-to-Area Predictions for Terrestrial Services in the Frequency Range 30 MHz to 3000 MHz", P Series, Radiowave propagation, International Telecommunication Union, Oct. 2009, 57 pages.
ITU-R, Radiocommunication Sector of ITU, p. 452-14, "Prediction Procedure for the Evaluation of Interference between Stations on the Surface of the Earth at Frequencies Above about 0.1 GHz", P Series, Radiowave propagation, International Telecommunication Union, Oct. 2009, 56 pages.
ITU-R, Radiocommunication Sector of ITU,p. 528-3, "Propagation Curves for Aeronautical Mobile and Radionavigation Services Using the VHF, UHF and SHF bands", P Series, Radiowave propagation, International Telecommunication Union, Feb. 2012, 51 pages.
Office Action dated Mar. 12, 2015; U.S. Appl. No. 13/827,699, filed Mar. 14, 2013; 18 pages.
Final Office Action dated Jul. 1, 2015; U.S. Appl. No. 13/827,699, filed Mar. 14, 2013; 21 pages.
Notice of Allowance dated Sep. 3, 2015; U.S. Appl. No. 13/827,699, filed Mar. 14, 2013; 19 pages.
PCT International Search Report; Application No. PCT/CA2014/050189; May 23, 2014; 4 pages.
PCT Written Opinion of the International Searching Authority; Application No. PCT/CA2014/050189; May 23, 2014; 7 pages.
Canadian Office Action; Application No. 2,905,632; Aug. 9, 2016; 5 pages.
European Extended Search Report; Application No. 14762289.8; Sep. 28, 2016; 6 pages.

* cited by examiner

SPECTRUM CHANNEL SHARING SYSTEM

CROSS-REFERENCE TO RELATED APPLICATIONS

This application is a continuation of U.S. patent application Ser. No. 13/827,699 filed Mar. 14, 2013 by David G. Steer, et al. entitled "Spectrum Channel Sharing System" which is incorporated herein by reference as if reproduced in its entirety.

BACKGROUND

1. Technical Field

This application relates to communication systems and, more particularly, to sharing spectrum channels.

2. Related Art

In communication systems, spectrum assignments are typically static with only a single user, technology, system, or service being licensed to exclusively use a spectrum channel in a specific geographic area. For example, a television channel may be assigned to a broadcaster exclusively for its broadcast services and no other service may use that channel in the broadcaster's assigned area. This static model is adequate when there are more available channels than different users desiring channel assignments. However, as the number of spectrum users has grown over the years, there are often more users now than available unique spectrum assignments, thus creating a spectrum shortage.

In some scenarios, the user assigned to a spectrum channel may not utilize the channel in every location or at all times throughout the day or night. During the idle times, or beyond the user's application service range, the assigned spectrum channel goes unused. Thus, the use of these static channel assignments may result in at least a portion of the available spectrum being idle at various times or in various areas. These idle spectrum situations lower the overall level of spectrum utilization.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
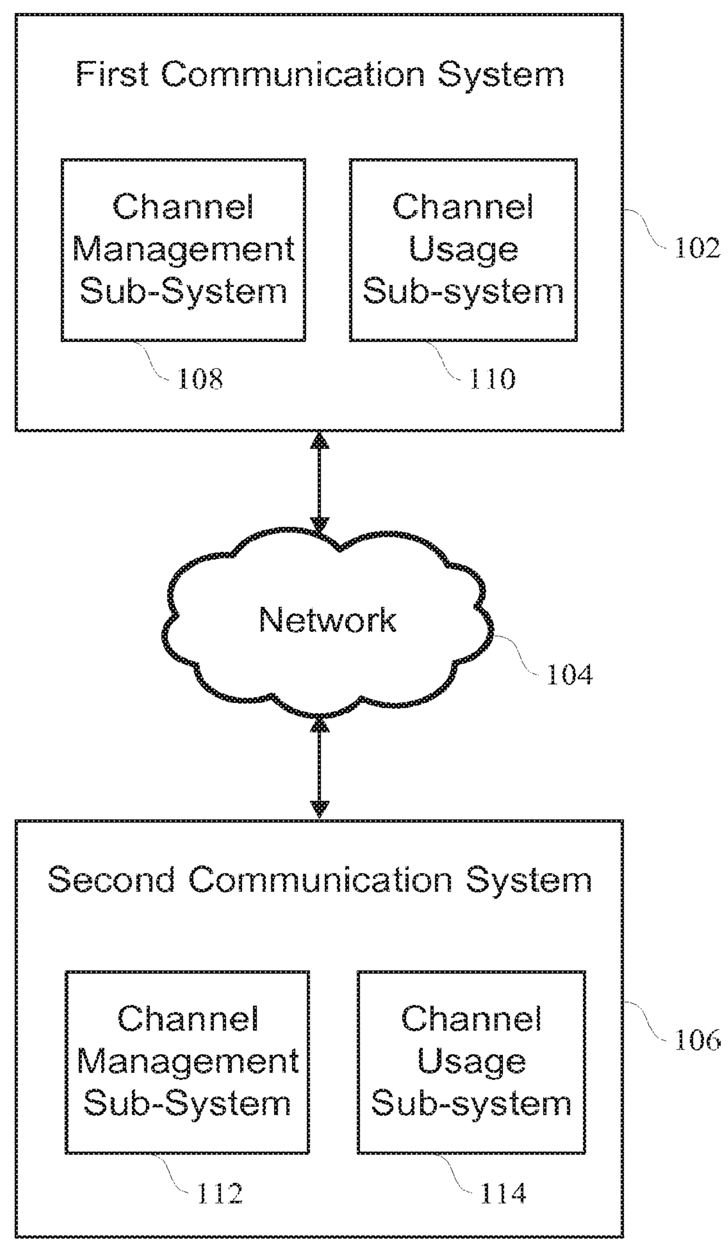
FIG. 1 illustrates a system for sharing a spectrum channel between multiple communication systems.

A spectrum channel sharing system may coordinate a shared usage of one or more spectrum channels between multiple systems. By sharing a spectrum channel between multiple different users, the system may alleviate spectrum shortage issues and improve the utilization of idle spectrum. In such a system, multiple users or services with similar or dissimilar technologies may be able to use the same bands or channels in common locations or overlapping areas. To manage the shared usage, the system provides for communication between the multiple spectrum users to dynamically orchestrate the sharing of the spectrum channels among their different services.

The spectrum channel sharing system provides a way for two or more spectrum users, systems, or different radio access technologies to dynamically coordinate their usage of a common set of spectrum channels. In one implementation, the spectrum channel sharing system manages the use of one or more spectrum channels (also referred to herein as a "channel set") between a "co-system" and an "alternate" network. The co-system may be considered the owner or licensee of the spectrum channel(s) and the party who is allowing the other service or party to use the co-system's assigned spectrum channel(s). The co-system may operate one or more communication systems, sensor systems, radiosondes, low Earth orbit satellites, surveillance, weather RADAR systems, or other radio frequency systems that do not require exclusive usage of the assigned spectrum channel(s) in all situations. The alternate network may be considered the secondary service that is permitted to use the co-system's assigned spectrum channel(s) when the channel(s) are not being exclusively used by the co-system. The alternate network may be a mobile telephone network or other communication system that could utilize additional spectrum channels when the channels are available. The alternate network may be the system that dynamically changes its use of a spectrum channel to accommodate the co-system's usage of the spectrum channel. In one implementation, a mobile network is the alternate network, such as a 3GPP network. In other implementations, the alternate network could be any other system that is sharing the spectrum with the co-system. For example, in these implementations, the alternate network could be a meteorological service, a RADAR station, public safety mobile service, or satellite service.

In some implementations, the channel sharing system may enable existing equipment to be utilized and does not require, for example, the co-system to utilize the technology or communication protocols of the alternate network system to become part of the shared or coordinated spectrum operations, which may reduce the cost of implementing the channel sharing operations between systems. In some implementations, the two system users of the shared channel utilize different network access technologies that are not compatible to operate on the same channel at the same time.

In one implementation, the co-system may be a system that uses one or more radio frequency channels assigned for meteorological use by radiosondes (e.g., weather balloons). In radiosonde systems, the channels (in the 1675-1683 MHz band in the US and Canada) are allocated to the meteorological service exclusively even though the measurements are typically only made twice a day (at 06:00 and 18:00 UTC) for less than an hour. The locations of the radiosonde launches are typically located away from major urban centers and the trajectory of radiosondes usually carries them away from populated areas. The duration of the radiosonde flight is usually 15-20 minutes, although in some circumstances the duration may be up to an hour. In the event that the radiosonde fails to deploy, a further launch may be initiated. It would be advantageous to be able to share the radio frequency channel(s) (i.e., one or more spectrum channels) assigned to the radiosonde with other services during the times when the radiosonde applications are not using the assigned channels, at locations where the radiosonde applications are not using the assigned channels, and/or in another way that does not interfere with the planned radiosonde operation.

In another implementation, the co-system may be a system that uses satellite platforms in low Earth orbits that place satellites above ground stations or specific areas of terrain periodically for short intervals of time. The locations and times of the satellite's operation on the ground are at intervals determined by the satellite's orbit and antenna configuration. In some cases, satellites do not make use of their assigned radio system channels on every pass over a ground location. Examples of such satellite systems include meteorological satellites that are returning weather sensor information, RADAR satellites that are imaging the ground, communications or observing satellites that send downlink information upon request or other satellites such as the Space Station that only communicate with designated ground stations. It would be advantageous to be able to share the satellite system's assigned channels with other services and/or parties during the times when the satellite applications are not using the assigned channels, at locations where the satellite applications are not using the assigned channels, and/or in another way that does not interfere with the planned satellite operation.

In yet another implementation, the co-system may be a system that uses RADAR transmitters located on the ground. These systems may utilize their channels in limited areas and at limited times. For example, costal maritime surveillance RADARs generally only utilize their channels over water areas and not the surrounding land, although some inland river surveillance RADARs do cover adjacent shore land areas. Many of the weather surveillance RADARs are also on a very slow scan rate, sometimes taking up to a half hour to complete a full scan. For these and other RADAR systems the assigned channels are unused in locations and times that are outside the range or beam pattern of the RADAR system's scanning operations. It would be advantageous to be able to share the RADAR's assigned channels with other services during the times when the RADAR applications are not using the assigned channels, at locations where the RADAR applications are not using the assigned channels, and/or in another way that does not interfere with the planned RADAR operation.

In still another implementation, the co-system may be a point-to-point system that uses fixed station locations that only make use of the assigned spectrum channel set along the path between the two fixed stations. Such point-to-point communications systems often make use of narrow-beam antennas that confine the usage of a channel set to the beam path between the stations. Outside the range of the beam path the channel set is unused. It would be advantageous to be able to share the communication link's assigned radio frequency channels (e.g., channel set) with other services and/or parties during the times when the point-to-point system is not using the assigned channels, at locations where the point-to-point system is not using the assigned channels, and/or in another way that does not interfere with the planned point-to-point system operation.

FIG. 1 illustrates a system for sharing a communication channel between a first communication system 102 and a second communication system 106 through a network connection 104. The system enables the first communication system 102 and the second communication system 106 to coordinate the shared usage of the communication channel between the communication systems 102 and 106. The first communication system 102 includes a channel management sub-system 108 and a channel usage sub-system 110. Similarly, the second communication system 106 includes a channel management sub-system 112 and a channel usage sub-system 114.

During operation, the channel management sub-system 108 of the first communication system 102 may inform (or notify) the channel management sub-system 112 of the second communication system 106 that that the channel usage sub-system 110 of the first communication system 102 is planning an operation that may use the one or more channels that are being shared between the systems. In other words, the channel set assigned to the communication system 102 (i.e., the co-system in the present example) is being utilized by the second communication system 106 (i.e., the alternate network). In response to this notification, the channel management sub-system 112 of the second communication system 106 may initiate a process to clear (i.e., remove traffic or otherwise adjust one or more channel aspects to reduce or eliminate conflict) communication traffic on the affected spectrum channels (i.e., one or more of the assigned communication channels which the communication system 102 requires for the planned operation and that the communication system 106 is currently using). For example, the channel management sub-system 112 may hand over active traffic being transmitted on the affected channel(s) to other radio frequency channels. The channel management sub-system 112 may also block (or buffer) further usage of the affected channel(s) by the second communication system 106 in the affected areas (i.e., the areas in which the communication system 102 requires usage of the affected channels for the planned operation).

One or more of the channel management sub-systems 108 and 112 may determine which radio frequency channels of a channel set may be affected by a planned operation of one of the communication systems 102 or 106 by comparing locations of the equipment of the first communication system 102 with locations of the equipment of the second communication system 106. Additionally, the affected time period (i.e., the time period in which the communication system 102 requires usage of the affected channels for the planned operation) may be determined by comparing the time of operation of the equipment of the first communication system 102 with the time of operation of the second communication system 106. The systems may also determine whether the equipment of the second communication system 106 is otherwise operating in a mode that utilizes a set of channel attributes which will not interfere with the equipment of the first communication system 102. For example, the second communication system 106 may be operating at a power level on the assigned channel set that will not interfere with the planned operations of the first communication system 102. As another example, the second communication system 106 may be operating using a signal that is orthogonal to the signaling utilized on an channel assigned to the first communication system 102 (e.g., through use of a different spreading code, time slot or sub-carrier assignment). Alternatively, the second communication system 106 may retransmit, on the assigned channel set, the signals of the first communication system 102, in addition to its own signals, to preserve the reception of the signals from the first communication system 102 at nearby receivers of the first communication system 102.

Once the affected channels have been sufficiently prepared for use by the channel usage sub-system 110 of the first communication system 102, the second communication system 106 may confirm to the first communication system 102 that the affected radio frequency channel is clear of traffic. The first communication system 102 may then launch its operation and initiate a communication session on the shared channel without interference from traffic of the second communication system 106. After the communication session of the first communication system 102 is complete, the channel management sub-system 108 of the first communication system 102 may then inform the channel management sub-system 112 of the second communication system 106 that the communication session is complete. The second communication system 106 may then unblock the affected radio frequency channel and return to using the affected channel for communication traffic (e.g., wireless mobile telephone or data services) of the second communication system 106.

By using the communication path through the network 104 to exchange information about channel usage between the communication systems 102 and 104, the multiple different systems may share the same spectrum and radio frequency channel assignments without radio interference to either service. This channel sharing system may be utilized in some implementations without a need to change the primary equipment of the respective communication systems. As one example, in some implementations, a spectrum channel may be shared without requiring the first communication system 102 to modify its communication session technology to conform to the communication session technology of the second communication system 106 (e.g., the first communication system 102 need not use a mobile radio compliant with the protocols of the second communication system 106). As another example, in some implementations, the management of the channel sharing system may use existing commands of the second communication system 106 (e.g., maintenance-busy commands) to control channel usage at the second communication system 106.

Figure 2:
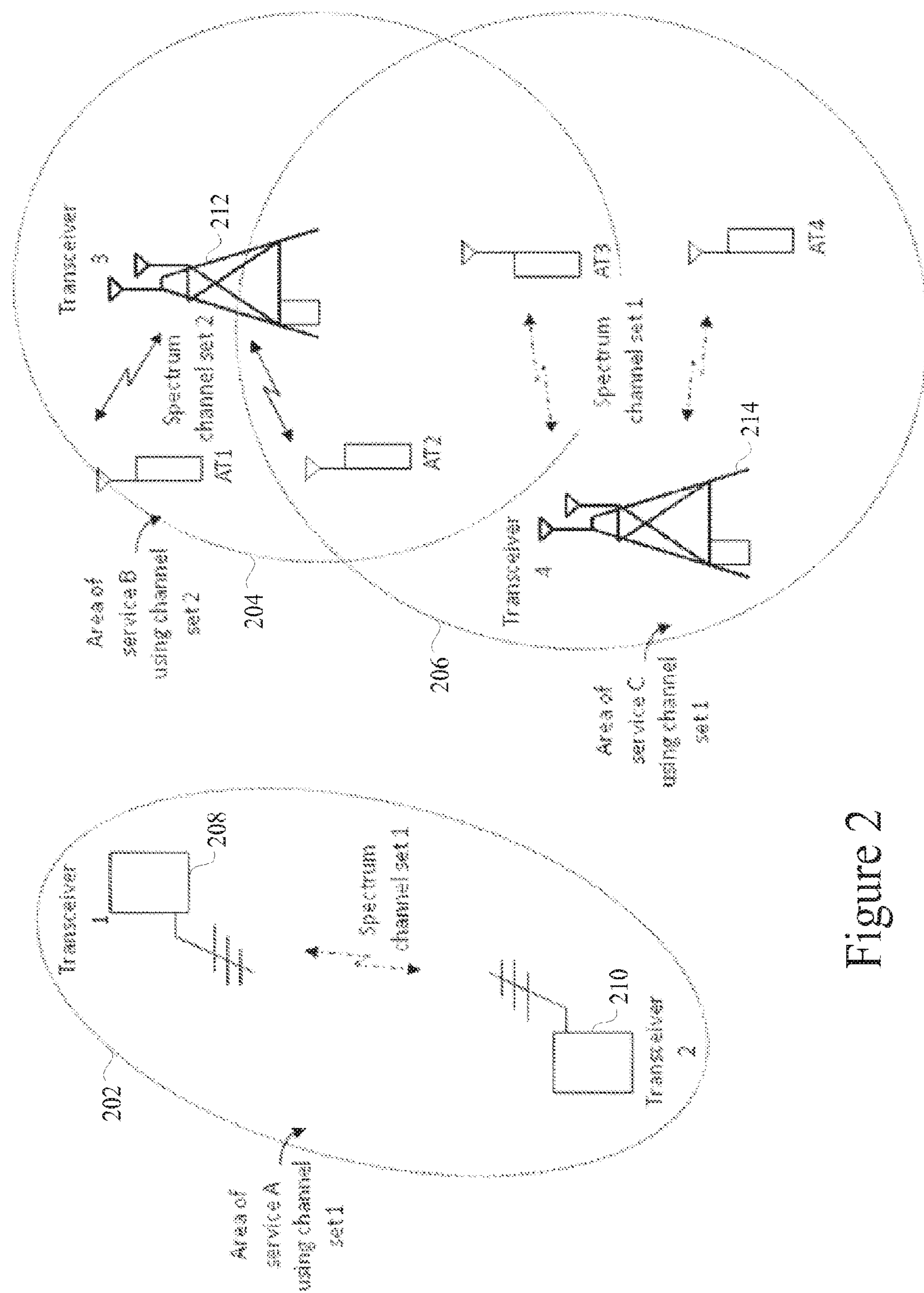
FIG. 2 illustrates multiple communication systems with non-overlapping areas of operation.

FIG. 2 illustrates communication systems with some non-overlapping areas of operation. The configuration of FIG. 2 shows static spectrum assignments with separated operating areas and spectrum channel set assignments. The operating areas include service area 202, service area 204, and service area 206. In this illustration of static assignments, service area 202 includes transceivers 208 and 210 that are assigned to a spectrum channel set 1 (where the set may include one or more channels for uplink and/or downlink, for example a channel set pair for uplink and downlink) for their exclusive communication use within the designated area. Similarly, service area 204 includes a transceiver 212 that is assigned spectrum channel set 2 for exclusive use for communication within service area 204 (e.g. to communicate with devices AT1 and AT2). Additionally, service area 206 includes a transceiver 214 that is assigned spectrum channel set 1 for exclusive use for communication within service area 206 (e.g. to communicate with devices AT3 and AT4). In this example static arrangement, service area 202 is distinct and separate from service areas 204 and 206. Thus, the service operating in service area 206 may reuse channel set 1 as it is in a different area than the service operating in service area 202. As service areas 204 and 206 overlap, they are assigned the distinct spectrum channel sets 1 and 2.

Figure 3:
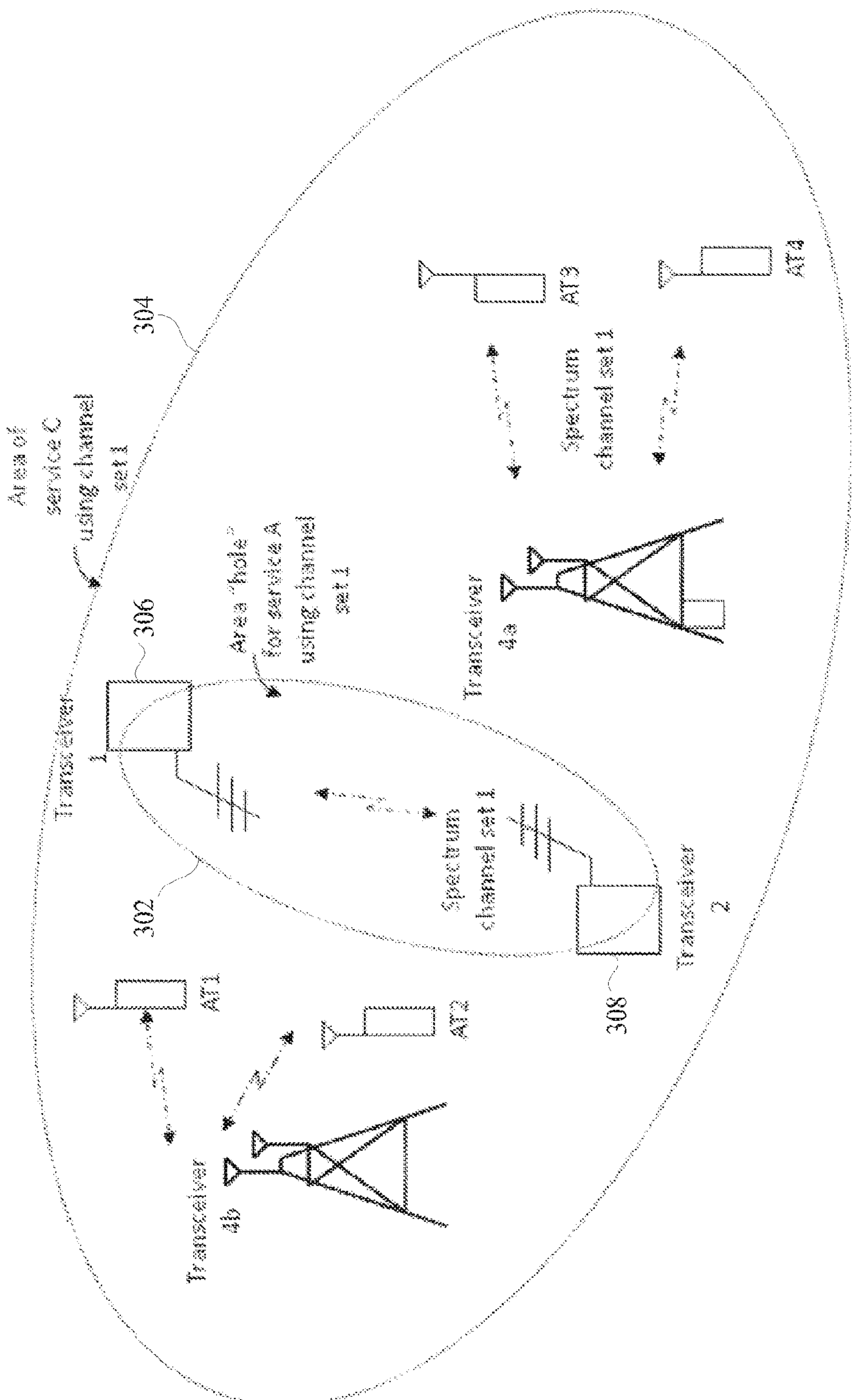
FIG. 3 illustrates multiple communication systems with overlapping areas of operation.

FIG. 3 illustrates multiple communication systems with overlapping areas of operation. FIG. 3 shows a hole 302 created within service area 304 allowing for a shared usage of a channel set among multiple communication systems within a geographical area common to the multiple communication systems (i.e., a geographic area within communication range of the multiple communication systems). For example, the channel sharing system may allow Service A to utilize channel set 1 within the hole 302 in the service area 304 used by Service C, which also utilizes channel set 1. The hole 302 is dynamically created, for example, by Service C (i.e., the alternate network) on the occasion of the need for transceivers 306 and 308 (i.e., Service A) to communicate. In other words, Service C is enabled to use the channel set assigned to Service A and, upon a need by the Service A system (i.e., the co-system) to use the channel set for transmission, the affected channel(s) of the assigned channel set within the common geographic area is cleared by Service C (i.e., the alternate system) to form the hole 302 for use by Service A. Such an example application may be communications between two fixed communications sites, or between a sensor and a receiving site. A "hole" may be identified and created based on characteristics of the planned operation of Service A, characteristics of the channel usage by Service C, or characteristics of both the planned operation of Service A and the channel usage by Service C. For example, the hole may be dynamically created based on any combination of characteristics of a planned operation and/or a channel usage, such as time of the planned operation, duration of the planned operation, geographical location associated with the planned operation (e.g., transmitter and/or receiver location of the components in the co-system), geographical location associated with the current channel usage (e.g., transmitter and/or receiver location of the components in the alternate system), physical layer effects, transmission power associated with one or more of the systems, beam forming direction associated with one or more of the systems, frequency offset associated with one or more of the systems, and/or the like.

As one example, the system of FIG. 3 enables co-service equipment, such as meteorological radiosondes (Service A), to share radio frequency channels with an alternate network, such as a mobile communications network (Service C). Alternatively, the configuration of FIG. 3 is similarly applicable to other technology or service sharing communication spectrum, including, for example, mobile services with general sensor systems, satellite platforms, RADAR systems, fixed link communication systems, other mobile systems, and combinations of cellular mobile technologies, such as GSM/EDGE/UMTS/LTE under 3GPP, or CDMA2000 under 3GPP2, IEEE Wireless LAN 802.11 standards, WiMAX, PPDR (Public Preparedness and Disaster Relief, such as radio systems utilized by public safety services), P25, or TETRA (Terrestrial Trunked Radio, such as professional mobile radio for public safety services).

In the implementation of FIG. 3, transceiver 308 may be the fixed radiosonde receiver and transceiver 306 may be the radiosonde balloon or other mobile platform. The area of the hole 302 may be the geographic area between the two transceivers 306 and 308. The radiosonde application apparatus (e.g., Service A) may include a facility for a co-service operator (e.g., a radiosonde operator) to communicate to the mobile network (e.g., Service C) with information associated with an impending usage of the spectrum and the associated location and channel set and for the two services to coordinate their activity.

In RADAR applications, the fixed transceiver 308 (e.g., the "RADAR" installation) may be at a single location, or it may include multiple locations with the transmitter and receiver locations separated by some distance. The transceiver 306 shown in FIG. 3 may not be a physical transmitting device in some implementations (e.g., in a RADAR application), but rather may represent something that causes a signal reflection, such as the environment or some other object (e.g., geography, weather, vehicle, aircraft, vessel, or another object that is a passive reflector or which may also contain a transponder).

In satellite applications, the transceiver 308 may be the satellite ground receiving/transmitter site, and the transceiver 306 may be the orbiting satellite. In some cases there may be multiple ground stations servicing, or being serviced, by a single satellite or a fleet ("constellation") of satellites.

Figure 4:
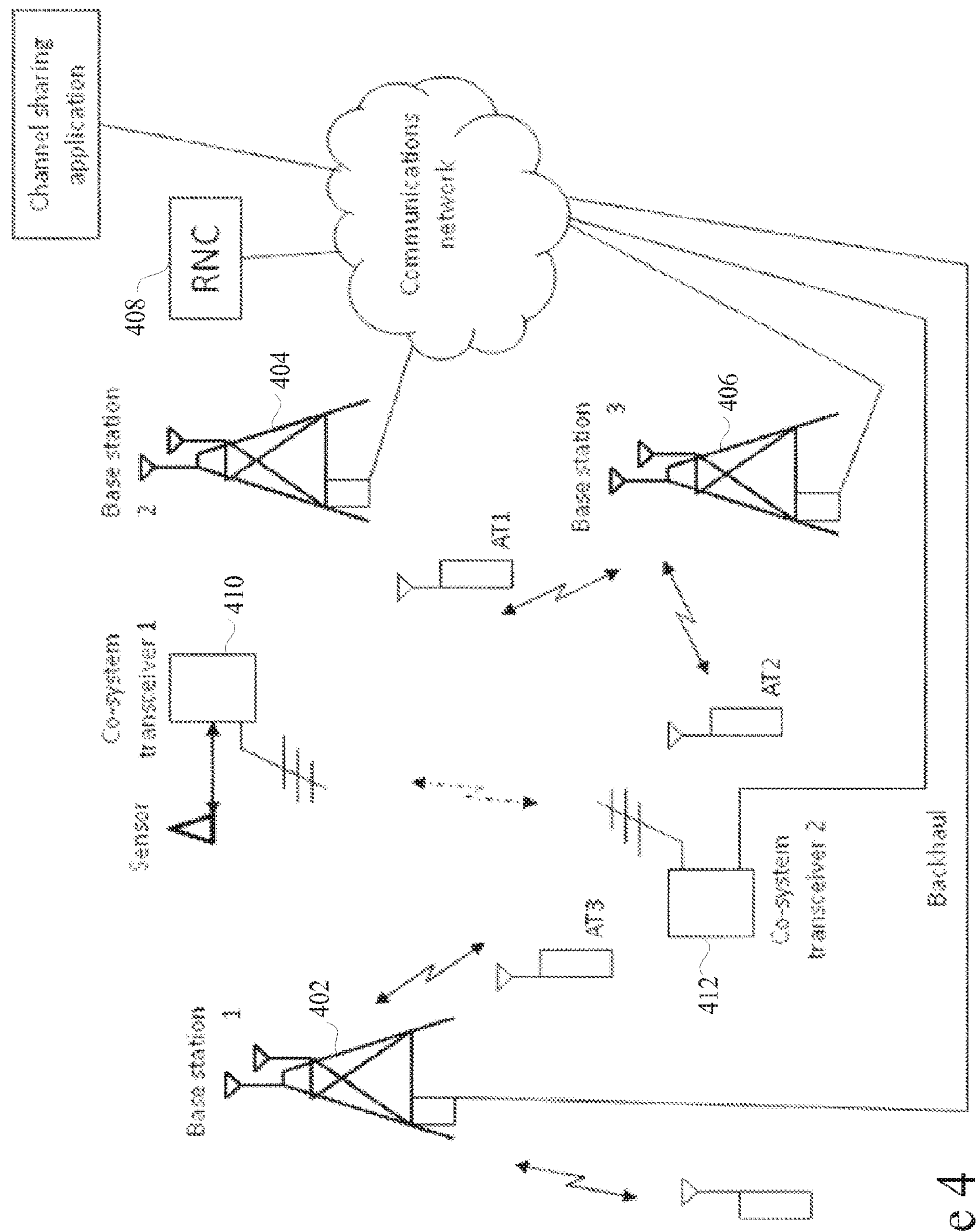
FIG. 4 illustrates one implementation of a network for communicating between a co-system and an alternate network.

FIG. 4 illustrates one implementation of a network for communicating between a co-system and an alternate network. FIG. 4 illustrates a scenario that enables sharing of a spectrum channel between a mobile network system and a sensor apparatus, such as a radiosonde. While this scenario is illustrated in the context of a mobile sensor such as a balloon lifted radiosonde for weather measurements, the scenario and method are equally applicable to coordinating static (fixed) or mobile radio systems used for other measurements, RADAR, sensing, or communications operations.

The alternate network mobile system includes the base stations 402, 404, and 406 that are connected (e.g., "backhaul") via a communications network to mobile network facilities that may include a "radio network controller" (RNC) 408 and other network administration facilities. The RNC 408 or other network facilities include the capability to monitor and alter the channels of operation of the mobile service. The mobile network may also include a channel sharing application 410, such as an application running at a channel management server that manages the channel sharing arrangement with the co-system network. In some implementations, the channel sharing application is part of the alternate network. In other implementations, the channel sharing application of the alternate network is supplemented by a channel sharing application in the co-system network. In still other implementations, the channel sharing application is part of the co-system network only. As one example, the channel sharing application may reside in a user terminal (System Operator Controller—"SOC") that may be used by the co-system operator to communicate with the alternate network mobile system, using aspects of the communications network, to indicate the need for dynamic channel sharing. The SOC is the equipment that the co-system operator technicians may use to make known their current requirements for their spectrum use. The radiosonde operator, for example, uses the SOC to input the needed channels, times, and affected areas for the next radiosonde launch. A video surveillance operator would use the SOC to input the needed channels, times, and affected areas for the next surveillance mission. A SOC may be an integral part of the co-system equipment/network or it may be a separate system.

In some instances, the channel sharing application may issue commands to the RNC or eNodeB (Evolved Node B) or other mobile network equipment to enable or disable radio frequency channel usage in the mobile network. Communication from the channel sharing application with the RNC or eNodeB may be via the co-system OAM (Operations, administration, and management) facility. Alternatively, the channel sharing application may format its instructions to communicate directly with the RNC or eNodeB using the data communications facilities or internal communications channels of the co-system network. The channel management functionality may be an aspect of the maintenance operations server for the network. In some embodiments, the co-system channel sharing application may communicate with a channel sharing application in the alternate network in order to select appropriate channels to be affected for example, to enable the largest possible contiguous bandwidth to be aggregated.

Within the mobile network coverage area of the base stations 402, 404, and 406 there may be handsets (e.g. AT1, AT2, AT3) communicating with other users or services via the communications network and the base stations 402, 404, and 406 using their assigned radio channels. The radio frequency channels assigned to the mobile system may overlap some or all of the channel assignments for the co-system (e.g., such as the radiosonde sensors).

Within the alternate network's coverage area may be a co-system transceiver site where other system equipment is operated and their signals received. The co-system may include transceivers 410 and 412. The co-system operation area may be, for example, where radiosondes are launched using their attached balloons and the radiosonde signals are received (e.g., transceiver 412). The radio signals from the radiosondes (e.g., transceiver 410) are received at the radiosonde transceiver station typically using a high gain directional antenna that tracks the radiosonde's path as it ascends into the atmosphere and reports the weather conditions. In some instances, the radiosonde station may also transmit signals to the radiosonde that are used for tracking and range measurements. The co-system site may also include a System Operator Communicator (SOC) that is used to communicate between the co-system operations and the alternate network's management system. The SOC may be linked to the communications network using a radio channel as shown via base station 402, or it may be linked by wire or fiber to the network.

Figure 5:
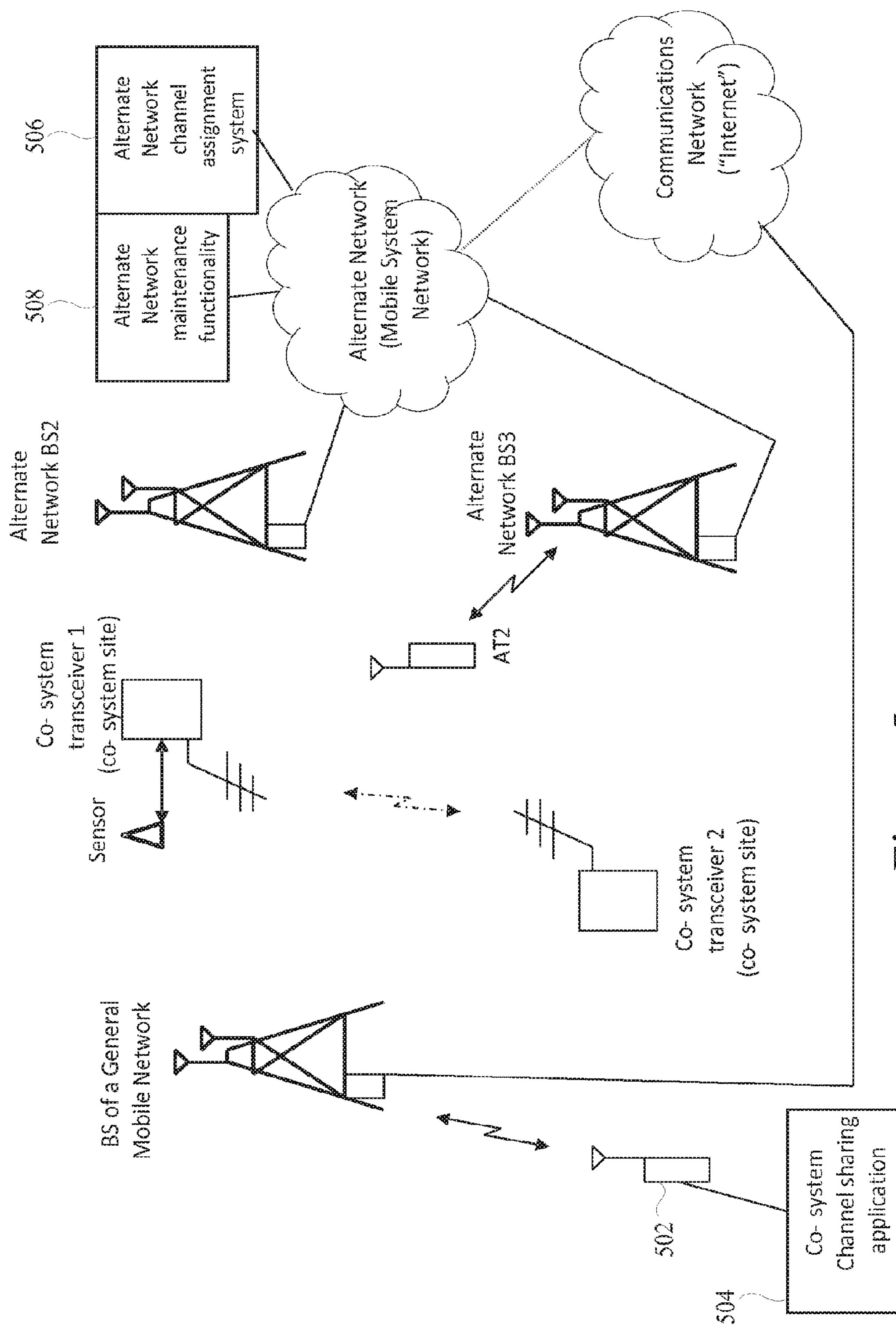
FIG. 5 illustrates another implementation of a network for communicating between a co-system and an alternate network.

FIG. 5 illustrates another implementation of a network for communicating between a co-system and an alternate network. As shown in FIG. 5, the SOC may be a mobile handset (e.g., "smartphone" or User Equipment "UE") 502 with an included channel sharing application 504. This application may communicate with the alternate network channel assignment system 506 either directly (e.g., to the RNC) or indirectly via other entity such as a network maintenance functionality 508 that administers channel usage for the alternate network. In other implementations, the SOC may be an automatic apparatus integrated with the co-system operations transceiver and control equipment that communicates with the alternate network channel assignment processes. In some implementations, the system operator communicator (SOC) is a UE operated by a co-system user that hosts the application that manages the channel assignment amongst the co-system and the alternate system. The application may be generic for the whole co-system territory, or it may be local to a specific region where the co-system is operating (e.g., local to the area where the radiosonde is launched or the PPDR surveillance link is being activated).

Figure 6:
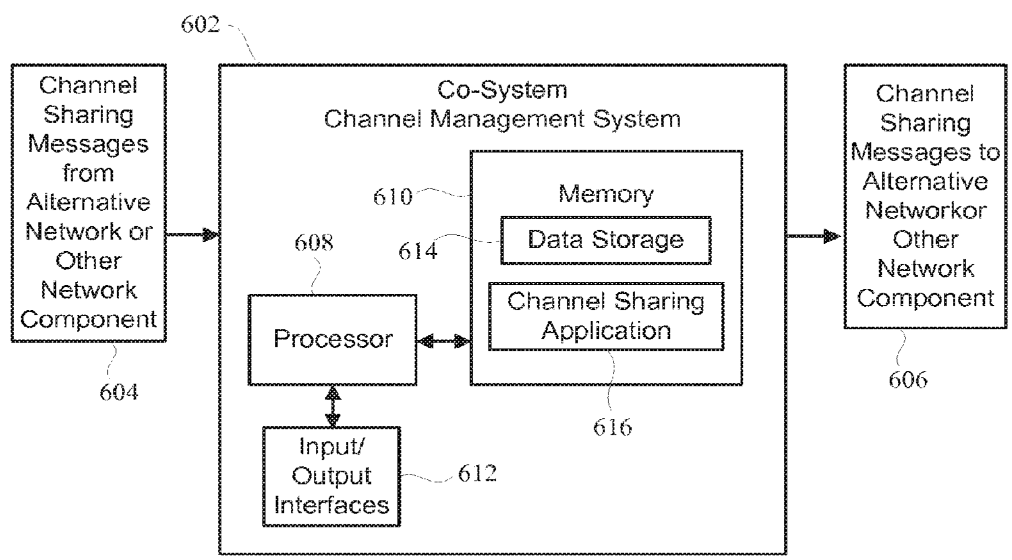
FIG. 6 illustrates a channel management system for a first communication system.

FIG. 6 illustrates a channel management system 602 for the co-system side of shared channel. The channel management system 602 receives channel sharing messages 604 from the alternate network side of the shared channel, or from other network components in the co-system. The channel management system 602 also transmits channel sharing messages 606 to the alternate network side of the shared channel, or to other network components in the co-system.

The channel management system 602 includes one or more processors 608, one or more memory devices 610, and one or more input/output interfaces 612. The input/output interfaces 612 may be used to connect the channel management system 602 with other devices or networks. The processor 608 may be a computer processor implemented as a central processing unit (CPU), microprocessor, microcontroller, application specific integrated circuit (ASIC), or a combination of circuits. In one implementation, the processor 608 is a specialized microprocessor with an architecture optimized for a specific application, such as a channel sharing application, or a specific device, such as a mobile communication device (e.g., a smartphone or tablet computer). The memory device 610 may include a magnetic disc, an optical disc, RAM, ROM, DRAM, SRAM, Flash and/or any other type of computer memory. The memory device 610 is communicatively coupled with the computer processor 608 so that the computer processor 608 can access data stored on the memory device 610, write data to the memory device 610, and execute programs and modules stored on the memory device 610.

The memory device 610 includes one or more data storage areas 614 and one or more programs. The data and programs are accessible to the computer processor 608 so that the computer processor 608 is particularly programmed to implement the channel sharing functionality of the system. The programs may include one or more modules executable by the computer processor 608 to perform the desired channel sharing functions. For example, the program modules may include a channel sharing application 616. The memory device 610 may also store additional programs, modules, or other data to provide additional programming to allow the computer processor 608 to perform the functionality of the channel management system 602. The described modules and programs may be parts of a single program, separate programs, or distributed across multiple memories and processors. Furthermore, the programs and modules, or any portion of the programs and modules, may instead be implemented in hardware or circuitry.

Figure 7:
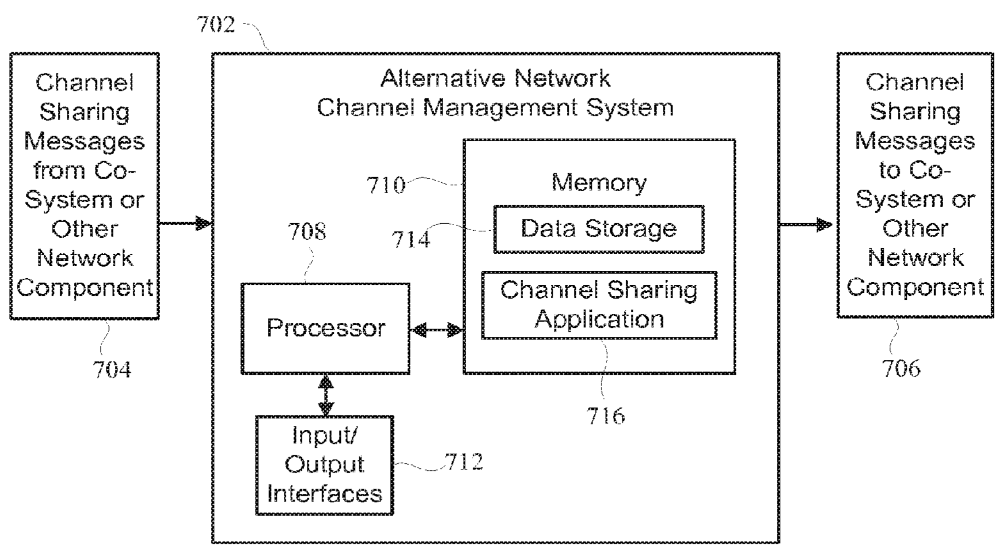
FIG. 7 illustrates a channel management system for a second communication system.

FIG. 7 illustrates a channel management system (e.g., server) 702 for the alternate network side of shared channel. The channel management system 702 receives channel sharing messages 704 from the co-system side of the shared channel, or from other network components in the alternate network. The channel management system 702 also transmits channel sharing messages 706 to the co-system side of the shared channel, or to other network components in the alternate network. FIG. 7 includes one or more processors 708, one or more memory devices 710 (including one or more data storage areas 614 and one or more programs, such as the channel sharing application 716), and one or more input/output interfaces 712. The descriptions above of components 608, 610, 612, 614, and 616 in connection with FIG. 6 are incorporated herein for the corresponding components 708, 710, 712, 714, and 716 of FIG. 7.

Figure 8:
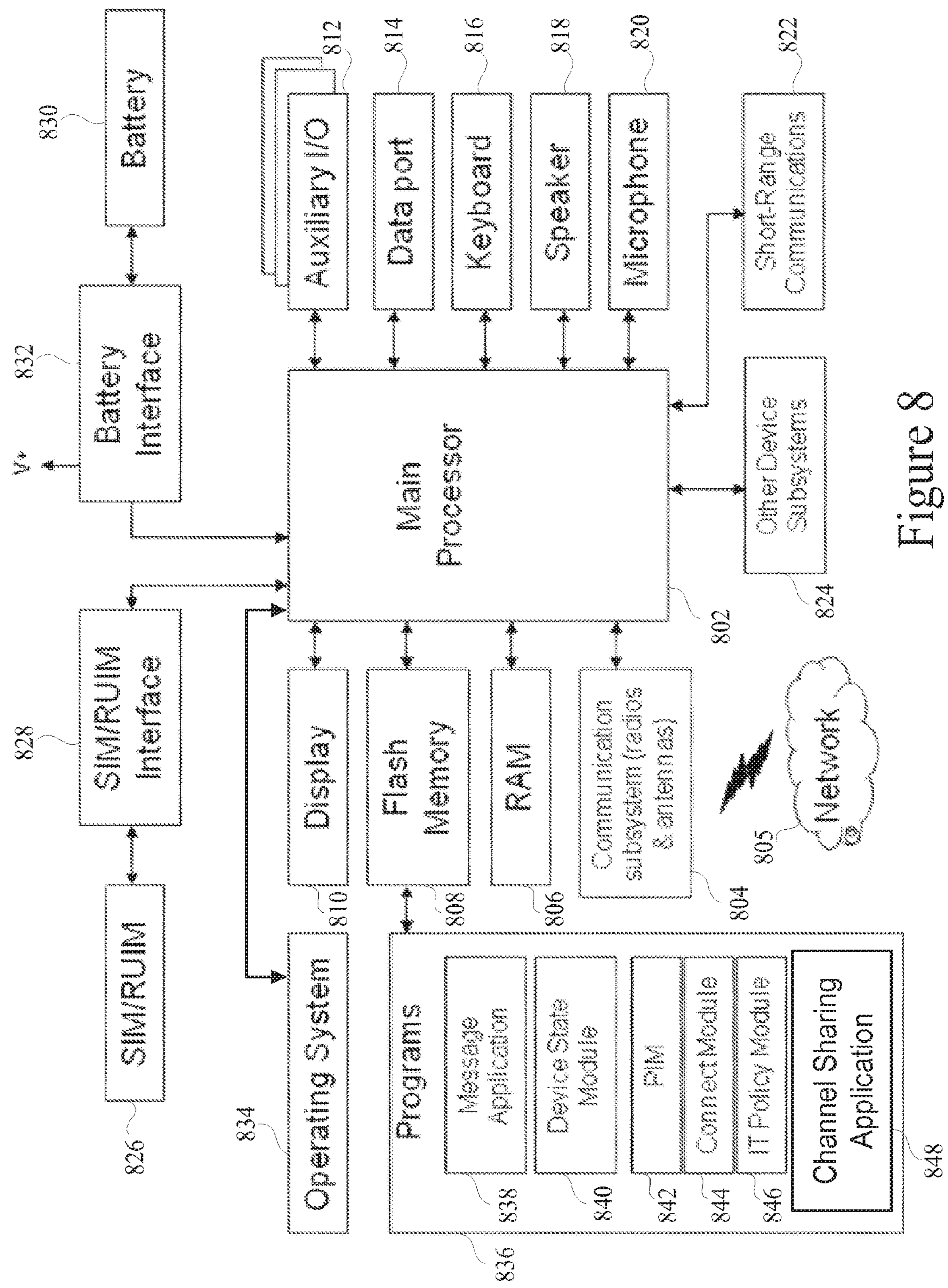
FIG. 8 illustrates a mobile device programmed with a channel sharing application.

FIG. 8 is a block diagram of one implementation of user equipment 800 (e.g., a mobile communication device, such as a smartphone) programmed with a channel sharing application. User equipment 800 includes a number of components, such as a main processor 802 that controls the overall operation of user equipment 800. Communication functions, including data and voice communications, are performed through a communication subsystem 804. The communication subsystem 804 receives messages from and sends messages to wireless network 805. The communication subsystem 804 may be configured in accordance with Universal Mobile Telecommunications System (UMTS) technology using the UMTS Terrestrial Radio Access Network (UTRAN) or Long Term Evolution (LTE) technology using Evolved UTRAN (E-UTRAN). Alternatively, the communication subsystem 804 may be configured in accordance with the Global System for Mobile Communication (GSM) and General Packet Radio Services (GPRS) standards. In other implementations, the communication subsystem 804 may be configured in accordance with other mobile communication protocols. The wireless link connecting communication subsystem 804 with wireless network 805 represents one or more different radio frequency (RF) channels, operating according to defined protocols specified for the particular communication technologies being employed. These channels may be capable of supporting both circuit switched voice communications and packet switched data communications.

Other wireless networks also may be associated with user equipment 800 in various implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE and UMTS, fourth-generation (4G) networks, and Long Term Evolution (LTE) networks. Examples of other voice-centric data networks include Personal Communication Systems (PCS) networks like GSM and Time Division Multiple Access (TDMA) systems.

Main processor 802 interacts with additional subsystems such as random access memory (RAM) 806, flash memory 808, display 810, auxiliary input/output (I/O) subsystem 812, data port 814, keyboard 816, speaker 818, microphone 820, short-range communications 822, and other device subsystems 824. Some of the subsystems of user equipment 800 perform communication-related functions, whereas other subsystems may provide resident or on-device functions. For example, display 810 and keyboard 816 may be used for both communication-related functions, such as entering a text message for transmission over network 805, and device-resident functions such as a calculator or task list or the channel management system.

User equipment 800 may send and receive communication signals over wireless network 805 after required network registration or activation procedures have been completed. Network access is associated with a subscriber or user of user equipment 800. To identify a subscriber, user equipment 300 may use a SIM card/RUIM 826 (i.e., Subscriber Identity Module or a Removable User Identity Module) to be inserted into a SIM/RUIM interface 828 in order to communicate with a network. SIM card or RUIM 826 is one type of a conventional smart card that can be used to identify a subscriber of user equipment 800 and to personalize user equipment 800, among other things. SIM card/RUIM 826 may include a processor and memory for storing information. The SIM card/RUIM 826 may enable a subscriber to access subscribed service, such as web browsing and messaging such as e-mail, voice mail, Short Message Service (SMS), and Multimedia Messaging Services (MMS), point of sale, field service, and sales force automation. Once SIM card/RUIM 826 is inserted into SIM/RUIM interface 828, it is coupled to main processor 802. As an alternative to the SIM card/RUIM 826, user identification information may be programmed into flash memory 808.

User equipment 800 may be a battery-powered device and includes battery interface 832 for receiving one or more rechargeable batteries 830. In at least some embodiments, battery 830 may be a smart battery with an embedded microprocessor. Battery interface 832 may be coupled to a regulator, which assists battery 830 in providing power V+ to user equipment 800. Although current technology makes use of a battery, future technologies, such as micro fuel cells or photovoltaic cells, may provide the power to user equipment 800.

User equipment 800 also includes operating system 834 and other programs 836. Operating system 834 and programs 836 may be implemented as software components that are run by main processor 802. Operating system 834 and programs 836 typically are stored as program code on a media readable by a processor, such as main processor 802. Such readable storage media may include a persistent storage device, such as flash memory 308, which may alternatively be a read-only memory (ROM) or similar storage element. Those skilled in the art will appreciate that portions of operating system 834 and programs 836, such as specific device applications, or parts thereof, may be temporarily loaded into a volatile storage device, such as RAM 806. Other software components also may be included, as is well known to those skilled in the art.

Programs 836 that control basic device operations, including data and voice communication applications, will normally be installed on user equipment 800 during its manufacture. Other programs 836 include message application 838. Message application 838 can be any suitable software program that allows a user of user equipment 800 to send and receive electronic messages. Messages that have been sent or received by the user are typically stored in flash memory 808 of user equipment 800, or some other suitable storage element in user equipment 800. In some implementations, some of the sent and received messages may be stored remotely from user equipment 800, such as in a data store of an associated host system.

Programs 836 may further include device state module 840, Personal Information Manager (PIM) 842, and other suitable modules. Device state module 840 provides persistence, i.e., device state module 840 ensures that some device data is stored in persistent memory, such as flash memory 808, so that the data is not lost when user equipment 800 is turned off or loses power. PIM 842 includes functionality for organizing and managing data items of interest to the user, such as, but not limited to, e-mail, contacts, calendar events, voice mails, appointments, and task items. User equipment 800 also includes connect module 844, and IT policy module 846. Connect module 844 implements the communication protocols that are used by user equipment 300 to communicate with the wireless infrastructure and any host system, such as an enterprise system. Connect module 844 may include a set of Application Program Interfaces (APIs) that can be integrated with user equipment 800 to allow user equipment 800 to use any number of services associated with an enterprise system. IT policy module 846 receives IT policy data that encodes the IT policy. IT policy module 846 then ensures that the IT policy data is authenticated by user equipment 800. The IT policy data can then be stored in flash memory 806 in its native form. Other types of programs or software applications also may be installed on user equipment 800. These software applications may be third party applications, which are added after the manufacture of user equipment 800. Examples of third party applications include games, calculators, utilities, and the like.

User equipment 800 is programmed with a channel sharing application 848 that enables the user equipment 800 to manage the shared usage of one or more spectrum channels. The channel sharing application 848 is a software package that, as part of the system operator controller (SOC), translates the co-system operator's input information associated with operational parameters (e.g., channel(s), time(s), geographic area(s), and/or other planned channel usage aspects) into suitable commands or instructions to the alternate network system to inform the alternate network system that it may no longer use the affected channels. In one example, the co-system sharing application runs on a system operator controller (SOC) that may conveniently be a mobile device connected to a communications network.

The channel sharing application 848 may include one or more stand-alone modules, or may be implemented, in whole or in part, as part of another module. The channel sharing application 848 may be activated when necessary to operate the channel sharing application, or activated when it is necessary to send or receive notifications (e.g., channel clear confirmations) to/from the mobile network 805. For example, the channel sharing application 848 may be initiated by the co-system operator to specify a change in channel allocations between the co-system and the alternate system. The co-system operator would indicate the required radio frequency channels, the times and location of usage. The channel sharing application 848 would communicate this information to the alternate system to request the changes in radio frequency channels. This communication may be provided using the data communications facilities that are provided for the user equipment device 800 where the channel sharing application 848 is running (for example, the co-system site). This communication may, for example, be with the operations administration and management (OAM) facility of the alternate operator's network. In this example, the channel sharing application 848 would function to translate the co-system operator's requirements into the needed commands to the OAM facility to disable the required RF channel locations and times.

In the case of the illustrated user equipment device 800, communications may occur over the communications subsystems 804 (radios & antennas) of the device 800 and be linked via radio to the communications network 805 where the communications would be communicated to the desired alternate mobile network's facilities. Addressing for the alternate network system would be included as part of the channel sharing application 848. With this arrangement, the channel sharing application 848 may interact with several mobile networks and enable co-system operations with multiple shared channel configurations with multiple mobile networks. In this embodiment, the channel sharing application 848 may be implemented as an application running on a mobile device. The channel sharing application 848 would communicate with the alternate network system to implement the needed channel usage. The user equipment 800 would serve as a remote access terminal to the mobile network's OAM center that will in turn communicate with the eNBs that restrict their RF channels. The communication may include coordination among the eNB to require the eNBs in a certain area to dynamically release the RF channel needed by the co-system (primary) user. In LTE, or other systems, the instructions from the application may pass through RRC (Radio Resource Control) messages to affected UEs to switch/add (multi-connectivity) radio channel in order to offload/move to a new available channel. In one implementation, the channel sharing application 848 communicates with the OAM center using an over-the-top data communications link, such as via the Internet Protocol (IP).

In the mobile device configuration of the co-system channel sharing application 848, advantage may be taken of the device's SIM/RUIM identification/authentication elements 826 connected to the SIM/RUIM Interface 828. The SIM/RUIM 826 may be used to authenticate the co-system channel sharing application 848 to the mobile network to ensure the security of the channel management application 848 with the co-system. Such authentication may also form the basis for credit/payment for using the shared spectrum. The co-system, for example, may receive credit for its spectrum shared based on the amount of spectrum and the time of use. In this context, the credit may be one or more of many different forms of credit, including, for example, monetary compensation for channel usage, or an agreement between operators for usage of spectrum channels at another time or in another frequency band, or the agreement may be for carriage of traffic via another network.

Figure 9:
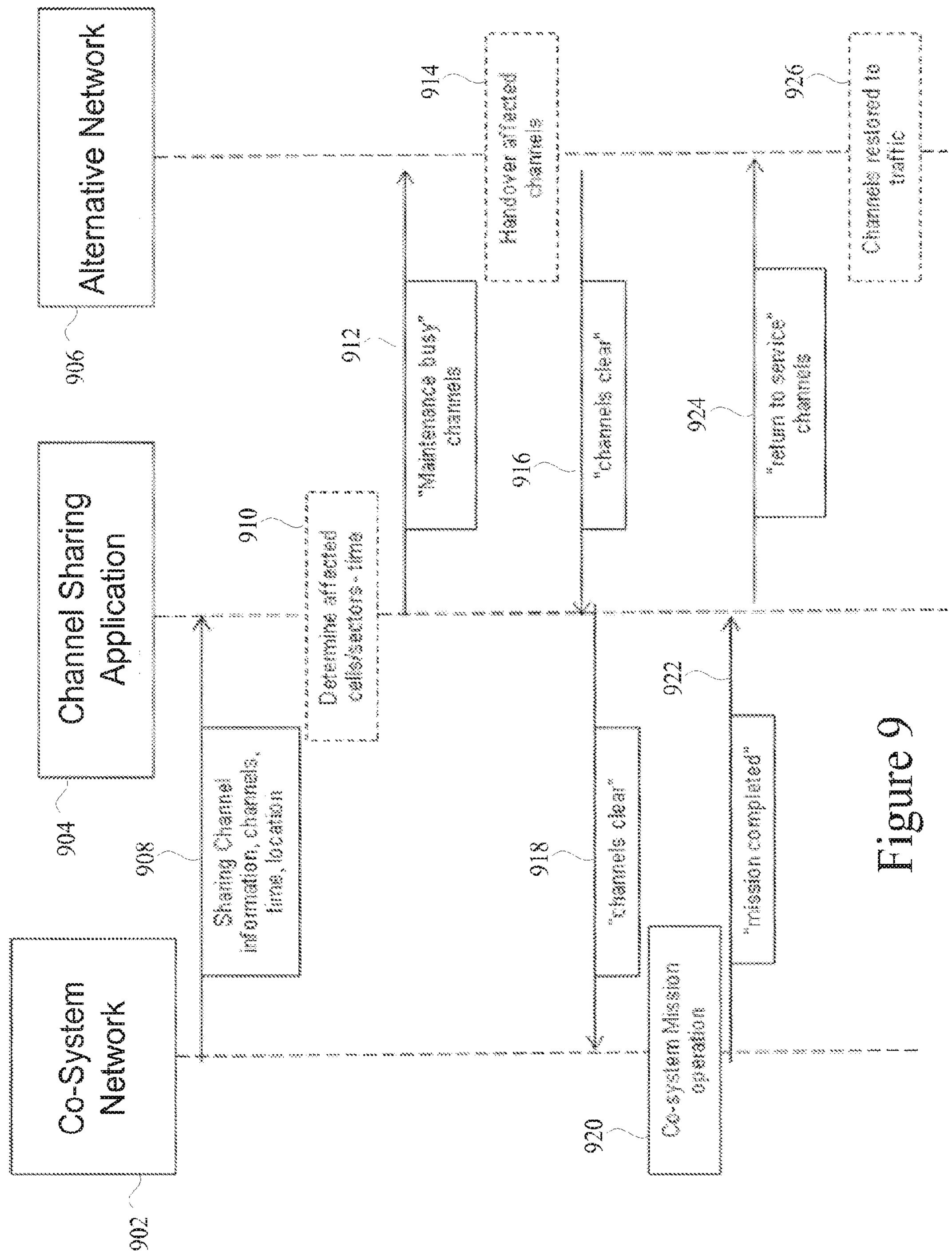
FIG. 9 illustrates a first channel sharing message exchange between communication systems.

FIG. 9 illustrates a first channel sharing message exchange between multiple communication systems. In the implementation of FIG. 9, a co-system network 902 and an alternate network 906 communicate through one or more channel sharing applications 904. The channel sharing application 904 coordinates a shared usage of one or more spectrum channels between the co-system network 902 and the alternate network 906. In one implementation, the channel sharing application 904 of FIG. 9 may be resident to the co-system network 902, such as in a system operator controller (SOC) of the co-system network 902. In another implementation, the channel sharing application 904 of FIG. 9 may be resident to the alternate network 906, such as in a channel management server of the alternate network 906. In still another implementation, the functionality of the channel sharing application 904 of FIG. 9 may be split between an application resident to the co-system network 902 and another application resident to the alternate network 906.

The SOC may be a mobile device used by the co-system operator to interact with the alternate network 906. The SOC may be a mobile handset ("smartphone") with an included channel sharing application that communicates with the alternate network operations center or with a channel sharing application in the alternate network 906. Alternately, the SOC could be an application resident on a computer at the co-system operator location that communicates, automatically or upon interactor command, information about co-system missions to the alternate network operations functionality. The interactor at the alternate network operations functionality may be, for example, an application operating in the RNC associated with the base stations or NodeB that are in the vicinity of the co-system operating site. Alternatively, when there is no specific RNC, as in an LTE network, the communication may be with the serving eNodeB. The serving eNodeB may communicate the co-system missions to neighboring eNodeBs over the X2 interface. The affected RNC or eNodeB may be determined from the location of the co-system operating site and the co-system's relation to the coverage area of the mobile network base stations or eNodeB. The channel management application may manage the allocation of channels in the area to accommodate the co-system operations. Alternatively, the SOC may communicate with an application in a channel management server located on the alternate network side. This server may be associated with mobile network or it may be an independent service. The server may receive the operating parameters for the co-system operation and determine the affected alternate network elements and then inform the alternate network of the needed channel re-assignments. This determination may include selection of channels to enable aggregation of spectrum in the co-system and the alternate network for maximum contiguous bandwidth availability. The channel sharing application in the user equipment will be triggered to start interacting with the alternate network by the co-channel user when a channel change is required. Initiation may be, for example, by the local radiosonde operator shortly before the time of balloon launch. In other applications, the channel sharing notification to the alternate network may be triggered automatically by, for example, the scheduling process for a satellite RADAR measurement system shortly before the time of satellite transit.

The operation message flow of FIG. 9 begins with the co-system operator communicating with the alternate network (e.g., by using the SOC) to inform the alternate network of the pending co-system operations. At step 908, the co-system network 902 determines the parameters of a planned operation (e.g., a sensor mission and/or communication session). This information exchange may include, but is not limited to, the time of operation (including proposed mission start time and expected end-of-mission time), the radio frequency channels to be occupied, the location of the active co-system transceiver apparatus, other operation parameters, or any subset of such information. If the co-system transceiver operation is more sensitive to interference in one direction over another, the information sent to the alternate network may include information such as the antenna response pattern and location of the antennas and their height. The system may use this antenna pattern information, as well as the other operation parameters, to create the appropriate (perhaps circular or non-circular) channel exclusion zone ("hole") where appropriate. For example, at step 910, the channel sharing application 904 determines the affected cells/sectors and time period. The SOC, using the channel management application that may be hosted on user equipment, will inform the alternate network of the need to alter channel usage (e.g., in one implementation using over-the-top signaling to the OAM interface of the alternate network). In the alternate network (e.g., LTE), both the affected eNodeBs and their associated user equipment may be informed of the needed changes. In some implementations, the information flow could be to the user equipment first over NAS signaling and then to the eNodeB via RRC or alternatively to eNodeB first via OAM and then to user equipment via RRC. It is expected that for LTE or other mobile systems, the user equipment will be managed to use the new channels by their host eNodeB. In some instances, where the alternate network has insufficient resources, the user equipment may be directed to other alternate network facilities.

If the SOC messaging is sent some time before the actual time of operation, the server may await until shortly before the planned start time before signaling the alternate network equipment to clear the channels. In some implementations, the channel management server actions may be implemented using the maintenance facilities inherent in the alternate network. The SOC and its channel sharing application may also issue channel "maintenance-busy" or channel "return-to-service" commands to the alternate network maintenance center which will set the status and activity of the system channels. For example, at step 912, the channel sharing application may send a "maintenance-busy" command to the alternate network to clear one or more channels for use by the co-system operations.

The communication of the pending co-system mission to the alternate network by the channel sharing application may specify the co-system's requested channels, the location of their use and the end of the planned operational use. This will facilitate basic co-system operations. In some embodiments, specifying additional information may facilitate more efficient sharing and coordination among several co-system operations. In these alternatives, the co-system may additionally communicate the planned future start time for the co-system channel use, its duration, or the predicted end time. In the event that the co-system requires additional channel usage, it may signal of new channel usage times, durations and end times. In some instances, the co-system may signal changes in operation such as "start of use" and "end of use" for a subset of channels that may be in co-system usage. In some instances, the communication may indicate which of a pre-organized set of co-system operational scenarios is to be invoked.

At the appropriate time after the alternate network has been notified of the pending co-system operation, the alternate network 906 will clear the affected spectrum channels in the affected area. For example, at step 914, the alternate network 906 hands over active traffic on the affected channels to other channels. The alternate network 906 may also block the assignment of new traffic to the affected channels in the affected area. In one implementation, the alternate network 906, upon receiving a request for shared channels for the co-system, determines the affected channels and the area of blockage. For example, in a sensor application for the typical radiosonde operation in the 1675-1683 MHz band, calculations using the typical systems' antenna gains and the receiver parameters indicate that mobile network transceivers within a surrounding range of about 10 km of the radiosonde launch site would need to be blocked from the radio frequency channels used by the radiosonde equipment.

The blocking distance may be calculated using the density of mobile device operations, their radiated power, and the path loss to the co-system operating site. The path loss, or exclusion range, should be at levels so that the aggregate of the signals from the distant mobile system transceivers is below the interference threshold for the co-system receiver. In one implementation, the area of blockage is calculated by considering the radio frequency of operation, the height of the antennas of the co-system receiver, the alternate system transmitter, the terrain, and the alternate system transmitter radiated power and bandwidth. The International Telecommunications Union (ITU) has published a number of reports outlining methods for calculating interference ranges between systems. The document ITU-R P.528 ("Propagation curves for aeronautical mobile and radionavigation services using the VHF, UHF and SHF bands"), for example, provides one guide in cases where the co-system is an airborne platform, such as a radiosonde. For ground based systems, such as RADAR or fixed or mobile services, the documents ITU-R P.1546 ("Method for point-to-area predictions for terrestrial services in the frequency range 30 MHz to 3000 MHz") and ITU-R P.452 ("Prediction procedure for the evaluation of interference between stations on the surface of the Earth at frequencies above about 0.1 GHz") may be used. In some implementations, the system (e.g., a system following the methods of ITU-R P.528 and P.1546) does not account for clutter in the environment of the mobile device transmitter if the alternate system is a mobile network with an antenna height below the height of objects such as buildings and vehicles in the vicinity. In other implementations, the system may also include the method for clutter compensation in ITU-R P.452, section 4.5.

In this example, the radiosondes that may be operated as a co-system have a signal bandwidth of about 180 KHz, and their operation would typically only affect one mobile network channel. If, however, the co-system channel overlapped two mobile network channels then the two channels may need to be blocked in the mobile system. In some mobile systems it may be possible to reduce the occupied channel bandwidth to accommodate the co-system usage (e.g., in an LTE system it may change from a 10 MHz RF bandwidth to 5 MHz or restrict the use of some radio resource bearers within an RF channel). In some instances, such as wideband satellite and terrestrial RADAR systems, the co-system operation may utilize multiple channels, or wide bandwidth channels and thereby affect multiple of the mobile operating channels. In some instances, such as Carrier Aggregation in LTE, the co-system operation may utilize multiple channels and in some embodiments, the ideas of this application may affect some or all of the LTE carriers. In some embodiments, the alternate system operation may simply suppress its use of a subset of the subcarriers covering the radiosonde radio frequency channels to create a "hole" in the spectrum wide enough for the radiosonde operation. Such an alternative may be appropriate for alternate system mobile devices that are separated at longer ranges from the radiosonde location and so may provide a sufficient reduction in co-system radio signal strength to enable the radiosonde receiver to not experience interference.

Alternatively, the co-system operator and the alternate network may make a prior agreement as to the necessary exclusion zones for channels being used by the co-system. The exclusion zones may be geographic areas and may also include exclusion of portions of the shared channel spectrum. In some instances, the geographic extent and the excluded spectrum may be different in different regions and for different network operations. These exclusion plans may be stored in the alternate network facilities or a channel management functionality or co-system channel sharing application for use at a later time. The channel management functionality may also find it advantageous, if it does calculate an exclusion distance or zone, to store the calculated information for use with later operations (and thus save the time and work of calculating the zone each time). However, in some instances, the parameter details of the calculation of the exclusion zone may change with time, with the atmospheric propagation conditions of the co-system, and with the mobile system radio signals. In these cases, the calculation may be recomputed for each co-system operation based on the current operating conditions.

As shown in step 914, the alternate network may clear the affected radio frequency channels by "handing over" any currently active traffic on these channels to other channels not being used by the co-system. The alternate network would hand over all the active traffic on the affected channels in the cells or sectors that provide coverage within the exclusion range of the active co-system transceiver sites. In some instances, the affected channels may be downlink only operating in aggregation with other channels in use by the alternate network's devices. In these instances the alternate network may, if needed, transfer traffic to other available radio frequency channels or defer the system's transmissions until the channel is again available.

This process may conveniently be accomplished, for example, by the channel sharing application issuing "maintenance busy" commands for the affected channels to the serving network transceiver stations and their associated controllers or maintenance operations center. This will have the effect of automatically initiating a hand over of current traffic for the affected channels and blocking their further use until the maintenance busy state is removed. With this technique, in some implementations, the system does not require any additional or new feature changes to the alternate network to operate in the shared mode. For example, the commands to enable and disable radio frequency channels are already available through the mobile network maintenance system.

In some instances, the channel sharing with the co-system may operate in a reverse mode. In this scenario, the alternate system, may request the co-system to refrain from using some channels. This may occur, for example, in cases of heavy traffic or services requiring high quality of service in the alternate system. The alternate network would then communicate with the co-system sharing application and request the co-system to refrain from usage of the indicated channels. In the case of the radiosonde sharing, for example, the launch of the radiosondes may be delayed a few minutes to allow the alternate network's peak traffic to clear.

Upon the successful clearing of the affected radio channels, the mobile network (through the RNC or the channel management functionality or maintenance system) may communicate with the channel sharing application at step 916 to indicate that the requested channels are all clear for the co-channel mission. At step 918, the channel sharing application sends a message to the co-system network indicating that the requested channels are clear. At step 920, upon receiving the all-clear indication (or at the designated start-time), the co-system operator may begin operations of its transceiver equipment on the affected channels to begin its mission.

At step 922, once the co-system mission is completed, the co-system operator, using the SOC and its channel sharing application, may communicate to the alternate network that the mission is completed and that the radio frequency channels are now available for alternate network use. If the mission end time was communicated as part of the initial set-up, the end message need not be sent if the actual completion of use is near to the predicted time. However, if the mission completes early it is advantageous for this early availability to be communicated with the alternate network to enable the channels to be brought back into service as soon as possible. If the mission is overtime, the SOC may also communicate the extended time requirement to the alternate network so that the channels remain blocked for the necessary additional time. In some implementations, in order to minimize communications overhead, when signaling the conclusion of one mission, the SOC may signal the future time of another planned mission. This will enable the sharing networks to plan for future use of the affected channels.

At step 924, upon receiving the message of completion of the co-system mission and the end of use of the affected radio frequency channels (or at the scheduled mission completion time), the alternate network 906 may unblock the radio channels and again operate its traffic over the channels. This may be conveniently accomplished by issuing a "return to service" maintenance command via the alternate network maintenance server (e.g. the OAM facility) for the affected channels. This will have the effect of unblocking the use of the channels and permitting them to again handle traffic. At step 926, the affected channels are restored to normal operation by the alternate network. New traffic may be assigned to the channels, deferred traffic may be started again, and traffic may be handed over from other channels.

Although the exchange of operations in FIG. 9 is shown in a particular order, other implementations may alter the order of operations, break a single operation into multiple operations, or combine multiple operations into fewer operations. As one example, in some implementations, the messages indicating confirmation that the channels have been cleared, and messages indicating confirmation that a mission has been completed, may be presumed to have occurred according to plan and need not be sent as individual messages, but rather may be combined into a common acknowledgment. As another example, in some implementations, additional messages indicating failures to clear channels or to complete the co-system mission may be sent.

While the description of FIG. 9 has been in the example context of a co-system operation with radiosondes, the described operations could equally be used for other operations. For example, the channel sharing operations could enable sharing channels that are used for downlink of information from polar (or other low-earth) orbit satellites that are periodically observed by a receiving station. In this alternative, the receiving station may inform the alternate network (e.g., a mobile network), using the SOC, of the impending transit of the satellite, the location and the affected radio frequency channels. This information would be communicated a sufficient time in advance of the visibility of the satellite to permit the mobile network to clear the affected channels. The satellite receiving station may then receive the signals from the satellite during its transit. Upon completion of the reception, the satellite receiving station would inform the mobile network, using the SOC, of the return to availability of the channels and the network could then make them available for its traffic. Similarly, co-systems such as RADAR and other satellite systems can communicate to the alternate system the channel sets, locations, and timing of the co-system beam pattern, orbits and transit times to ensure the channels may be cleared for use by the co-system transceivers at the appropriate times and locations.

Figure 10:
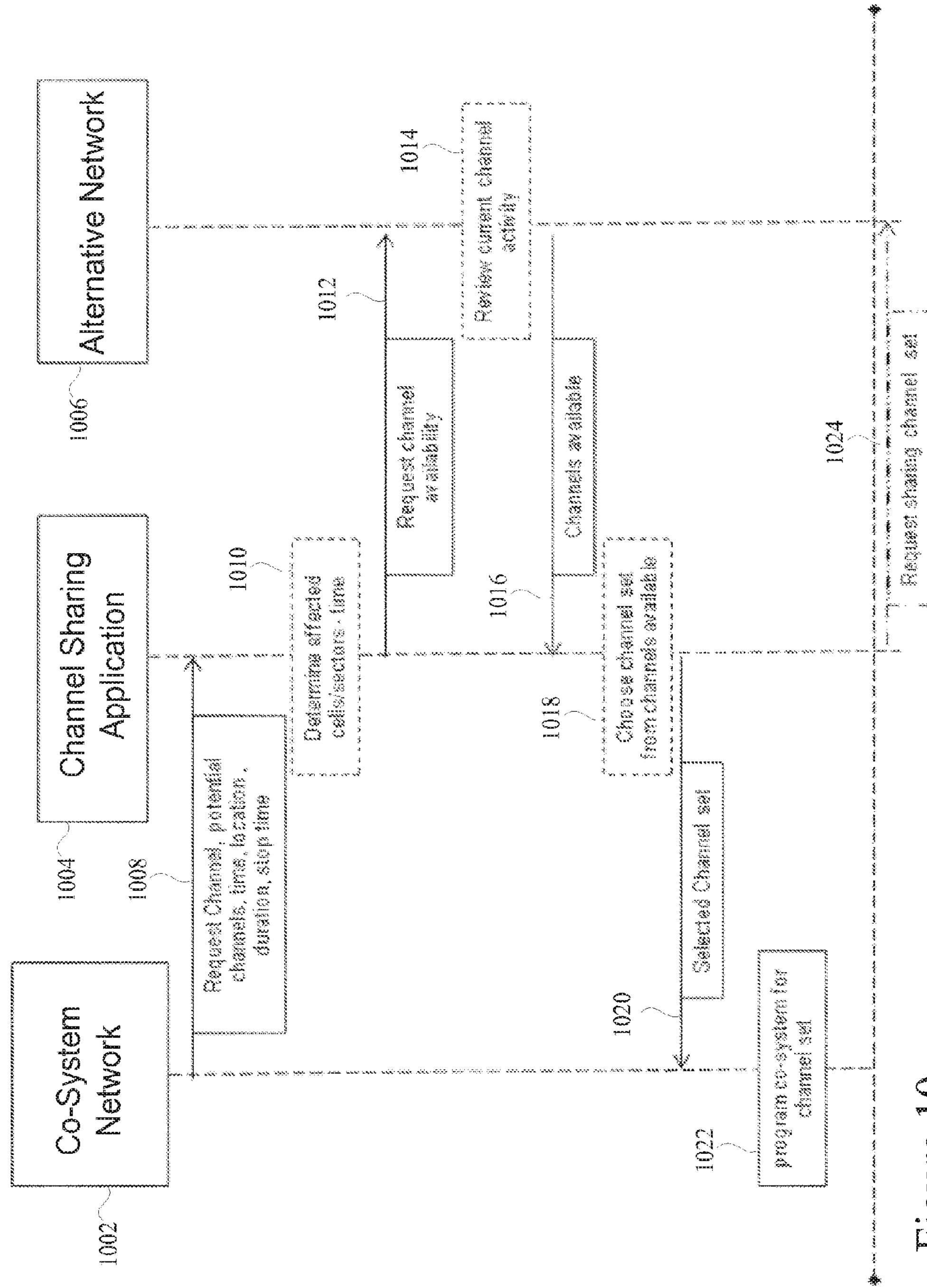
FIG. 10 illustrates a second channel sharing message exchange between communication systems.

FIG. 10 illustrates a second channel sharing message exchange between multiple communication systems. In the implementation of FIG. 10, a co-system network 1002 and an alternate network 1006 communicate through one or more channel sharing applications 1004, as discussed above in connection with FIG. 9. FIG. 10 illustrates an implementation where the channel management server of the alternate network 1006, or its channel sharing application, responds to queries from the SOC of the co-system network 1002 about suitable choices of operating radio frequency channels. The channel management server of the alternate network 1006 may consider its current traffic and operations in other nearby regions (e.g., there may be multiple co-systems operating at similar times from different areas of the alternate network) and respond with suggested radio frequency channels for the local co-system operation. The co-system operator may then program the co-system to the channel, or channels, suggested by the alternate network channel management facility. The query process may be completed by some systems before initiating the co-system operating mission coordinating sequence of signaling as outlined in FIG. 9.

At step 1008, the co-system network 1002 requests a channel for a pending co-system operation. The co-system network 1002 may gather parameters of the pending operation, such as potential channels, time of operation, location of operation, duration of operation, stop time of operation, or other operation parameters that would assist the alternate network 1006 select an appropriate spectrum channel for the co-system operation. At step 1010, the channel sharing application 1004 determines the affected geographic areas and time periods, as discussed above in connection with FIG. 9. At step 1012, the channel sharing application 1004 requests the alternate network 1006 to suggest an appropriate channel for the operation. The request message of step 1012 may include one or more of the operational parameters, affected areas, or affected times determined at steps 1008 and/or 1010. At step 1014, the alternate network 1006 reviews the current channel activity. At step 1016, the alternate network 1006 sends a list to the channel sharing application 1004 of one or more available channels for the co-system operation. The alternate network 1006 may consider competing requirements, other channel requests, and traffic load conditions on various channels before identifying the suggested channels to the channel sharing application 1004. At step 1018, the channel sharing application 1004 chooses one or more channels (e.g., a channel set) from the list of suggested channels. At step 1020, the channel sharing application 1004 notifies the co-system network 1002 of the selected channel for the co-system operation. At step 1022, the co-system programs the pending operation to use the selected channel. At step 1024, the channel sharing application 1004 notifies the alternate network 1006 of the selected channel, so that the alternate network 1006 can prepare the spectrum channel for the co-system operation, such as by clearing communication traffic from the selected channel, as described above in connection with FIG. 9.

Figure 11:
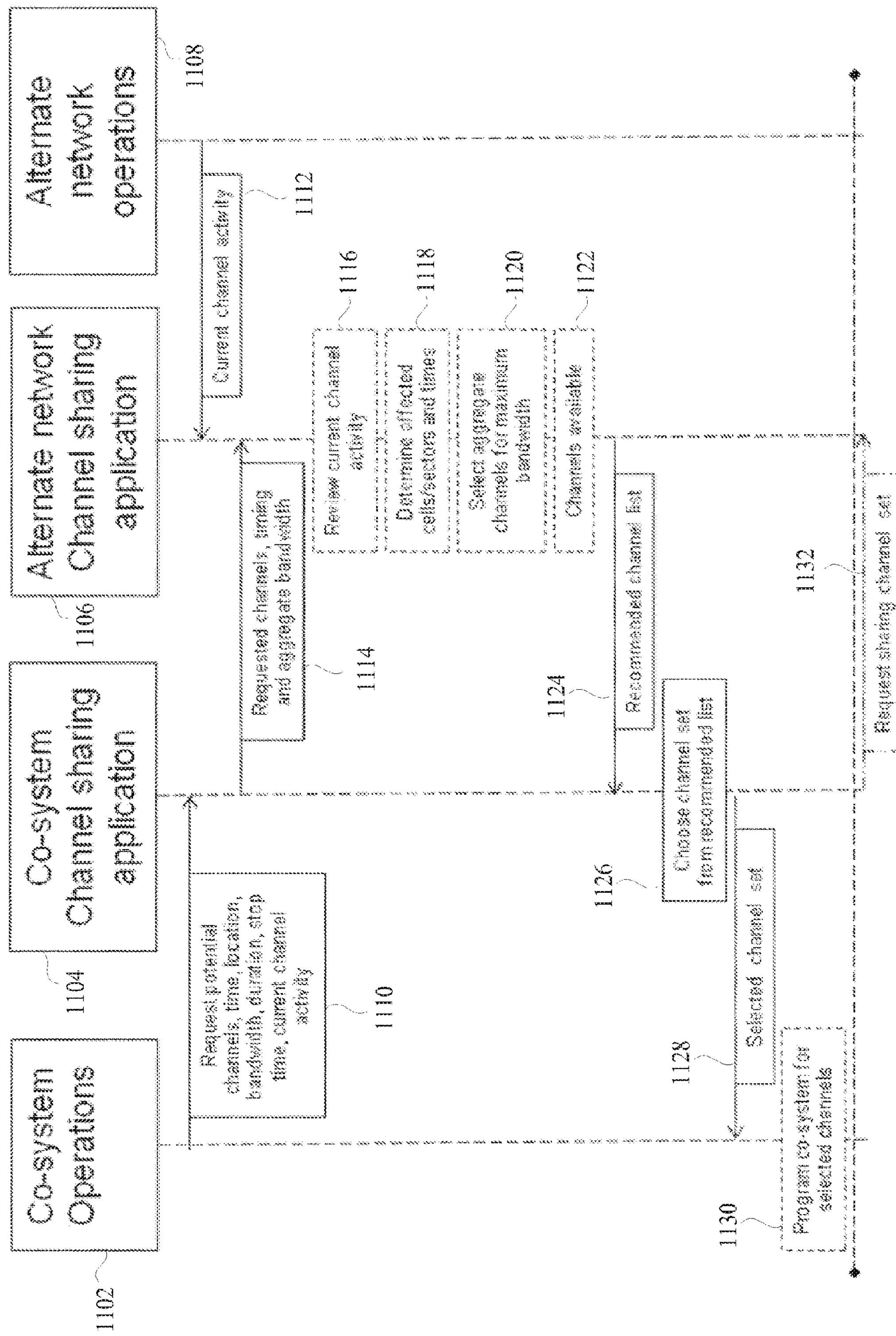
FIG. 11 illustrates a third channel sharing message exchange between communication systems.
Figure 8:
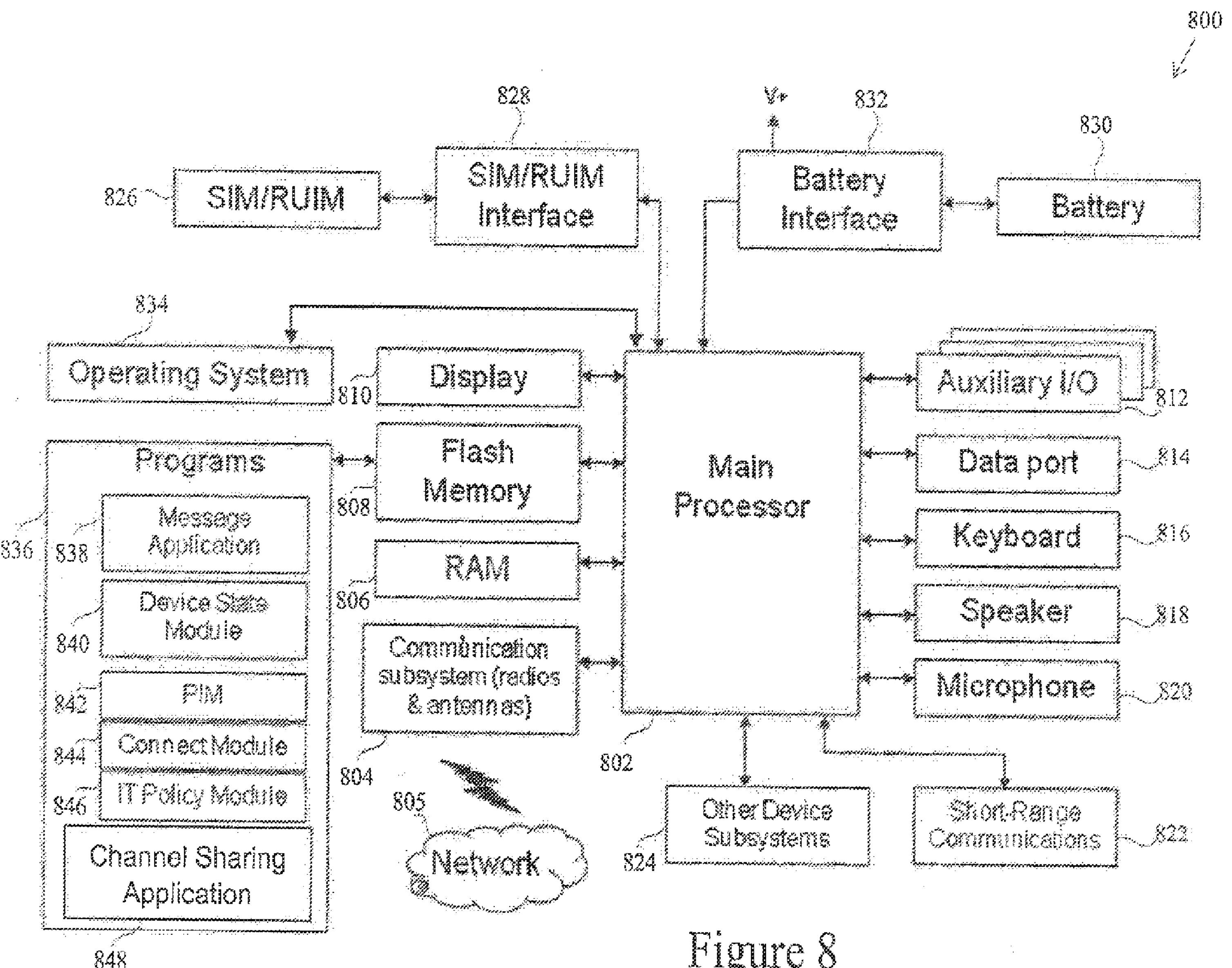

FIG. 11 illustrates a third channel sharing message exchange between multiple communication systems. In the implementation of FIG. 11, a co-system network 1102 and an alternate network 1108 communicate through channel sharing applications 1104 and 1106. FIG. 11 illustrates an implementation where the channel sharing applications function to maximize the contiguous bandwidth available for the sharing of the channels between the co-system network 1102 and the alternate system 1108. In this configuration, the co-system channel sharing application 1104 may communicate with a channel sharing application 1106 of the alternate network 1108. These two applications exchange information about current channel usage, exchange information about the requested channel usage, and select a channel set for the co-system use that maximizes the contiguous bandwidth available.

The co-system 1102 and the alternate network 1108 may work together to aggregate multiple channels between systems to facilitate a sufficient bandwidth for the services. In this coordination, the co-system 1102 and the alternate network 1108 may exchange messages to organize a group of contiguous channels to be cleared for the other system. In this implementation, the channel sharing applications include processes to indicate to the other system the amount of spectrum needed and to select the desired channels. An instance of the channel sharing application may be associated with, and utilized by both the co-system 1102 and the alternate network 1108. The method is applicable to radiosonde sensors as well as other types of sensors and co-systems with similar patterns of intermittent and non-contiguous geographic radio frequency and channel usage.

The channel sharing application functions to instruct the alternate network of the channels and base station that should be released to permit the co-system to carry out its mission (e.g., for the radiosonde to ascend or a PPDR surveillance link to operate or a satellite RADAR to pass over). In the arrangements in this discussion, the co-system is the licensed owner of the spectrum and the alternate network mobile system is being instructed to restrict its channel use (as it is the secondary user). In the implementation of FIG. 11, the co-system channel sharing application 1104 interacts with a similar functionality of the alternate network (e.g., the mobile network) to determine the most mutually agreeable channels to be relinquished or operated at lower power or range by the alternate network mobile system.

In the sequence of FIG. 11, at step 1110, the SOC of the co-system 1102 determines the required channels, times, and bandwidths for its upcoming mission. The SOC communicates its needs to the co-system channel sharing application 1104. This communication may happen automatically between apparatus of the co-system, or it may be entered by the co-system operators into the channel sharing application. The co-system channel sharing application 1104 then makes a query to the alternate network channel sharing application 1106 at step 1114. The query may include the channels, timing, and bandwidths needed for future operations. The alternate network channel sharing application 1106 is also appraised of the alternate network channel activity at step 1112. This activity may include activity that is current or planned across multiple alternate network sites and areas. With the request and the current activity, the alternate channel sharing application 1106 reviews the activity (step 1116), determines the affected channels cell/sector and times of operation (step 1118), and selects an aggregate channel list that best meets the bandwidth needs of the co-system (steps 1120 and 1122). This recommended channel list is then communicated from the alternate network channel sharing application 1106 to the co-system channel sharing application 1104 at step 1124. At step 1126, the co-system channel sharing application 1104 chooses the channel set that is most suitable from the recommended list. In some cases, for example, there may be fees associated with the channel sharing, and the co-system may make its set selection based on the fee structure as well as its bandwidth and operational needs. With the channel set selected, the co-system channel sharing application 1104 indicates the selected channels to the SOC of the co-system 1102 at step 1128 so that the co-system apparatus may be programmed as needed for the selected channel set at step 1130. At step 1132, the co-system channel sharing application 1104 may then make a request to the alternate network channel sharing application 1106 for sharing the channels, and the procedure continues to actually share the channels as described above in connection with FIG. 9. The alternate network channel sharing application 1106 would be informed of the RF channels that need to be cleared, the location of the clearing (area or specific eNodeB), and the times for clearance. In some instances, the information might also include reduced power limits or sub-carrier or radio resource block restrictions or improved adjacent channel emissions reductions. When the co-system usage is concluded, the alternate network sharing application 1106 may remove the restrictions.

In some implementations, the channel sharing system described herein may be used to allow the one of the communication systems to transmit data on a spectrum channel. However, in other implementations, the system may account for other modes of operation. For example, the system could apply to a "connected mode" of the mobile devices of the alternate network, but may also impact the "idle mode" for many mobile systems (e.g., 3GPP) for example or other systems (also called as RRC_Idle, Packet Idle mode, or the like). The channel sharing system may control generally any state where the device is not effectively transmitting data at the time but makes use of frequencies, receiving, waiting to add/receive data, or perform mobility within the network. For example, information received from the co-system or channel sharing application could be used by the devices or network to determine, filter, add, or remove channels on which to perform autonomous cell reselection in idle mode or Packet Idle mode in GERAN/UMTS/LTE. Such channel selection or reselection may possibly then be re-used by mobile devices of the alternate network in the connected mode, also called, e.g., RRC_Connected. Information received could take all range of granularity as described above in terms of location and/or timing, radio frequency channels and/or carriers. In an example, information received could be that there is no co-system channel usage within a certain area that makes use of a given band or set of radio frequency channels and therefore the mobile device or network could make use of this band or set of radio frequency channels for idle mode and/or connected mode. This information could be sent to the device and/or network periodically and/or upon change. In detail, the alternate system restrictions may also impact the eNodeB of small cells under the coverage of macro cell as all cells, including these the small cells that should be turned on/off to off to protect the primary co-system users.

In one implementation, the alternate system network could send information to the device (for example a single bit in the System Information messages in idle). The single bit could be either zero or one. When the bit is zero, the system may be indicating that the mobile device is not allowed to use the band for cell reselection and measurements. When the bit is one, the system may be indicating that the mobile device is allowed to use the band for cell reselection and measurements. Because the uplink and downlink RF emissions of the alternate network mobile system are often in different frequency bands there may be cases in which only the uplink transmissions from the mobile device (UE) may be blocked by the co-system use. In other cases only the downlink transmission from the NodeB are blocked and in some cases both directions may be blocked. If the downlink channels are blocked, the UE may be handed-over to another (unblocked) channel in the cell or to another unblocked channel on another cell. However, if only the uplink emissions (from the UE) are blocked, then in some cases the UE may chose to remain camped on the cell listening to the downlink signaling, but prepared to transfer to an unblocked channel or another cell if the UE needs an uplink for active uplink traffic or signaling. This arrangement may save handover resources, particularly if the co-system usage of the channel is expected to be brief, and it may enable a UE receiving downlink only traffic to continue its service uninterrupted.

Alternatively, in another example, the alternate system network could enhance the neighbor cell list provided to the mobile device with cells in the extra allowed band depending on information received from the co-system. This could apply to RRC_Idle and RRC_Connected (idle mode and connected mode). Note that the two implementations above could be combined, the network would indicate the extra frequencies/cells to the device, and would enable/disable their use on a cell, frequency or band basis. This alternative would minimize the frequent transmission of modified messages.

Each of the processes described herein may be encoded in a computer-readable storage medium (e.g., a computer memory), programmed within a device (e.g., one or more circuits or processors), or may be processed by a controller or a computer. If the processes are performed by software, the software may reside in a local or distributed memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments, features, and benefits of the present system have been described, it will be apparent to those of ordinary skill in the art that many more embodiments, features, and benefits are possible within the scope of the disclosure. For example, other alternate systems may include any combinations of structure and functions described above or shown in the figures.

What is claimed is:

1. A computer-implemented method of sharing a communications channel between multiple communication systems, comprising:

initiating, by a processor of a first communication system, a first communication session comprising communication traffic on a first radio frequency channel shared with a second communication system;

receiving, by the processor of the first communication system, a request to clear the first radio frequency channel of the communication traffic; and initiating, by the processor of the first communication system, a second communication session on a second radio frequency channel by transferring at least a portion of the communication traffic from the first radio frequency channel to the second radio frequency channel in response to receiving the request to clear the first radio frequency channel of the communication traffic.

2. The computer-implemented method of claim 1, wherein the request to clear the first radio frequency channel of the communication traffic comprises a maintenance-busy instruction.

3. The computer-implemented method of claim 1, further comprising re-initiating the first communication session on the first radio frequency channel by transferring the communication traffic from the second radio frequency channel to the first radio frequency channel in response to receiving a return-to-service instruction.

4. The computer-implemented method of claim 1, wherein the request to clear the first radio frequency channel of the communication traffic indicates a period of time for which the first radio frequency channel is to be clear of transmissions from the first communication system.

5. The computer-implemented method of claim 4, further comprising receiving a notification of a modification to the period of time for which the first radio frequency channel is to be clear of transmissions from the first communication system.

6. The computer-implemented method of claim 5, wherein the modification is an indication of early availability of the first radio frequency channel that enables the first communication system to begin transmitting communication traffic over the first radio frequency channel again, or wherein the modification is an indication of delayed availability of the first radio frequency channel that extends the period of time for which the first radio frequency channel is to be clear of transmissions from the first communication system.

7. The computer-implemented method of claim 1, wherein the request to clear the first radio frequency channel of the communication traffic is received prior to the first communication system initiating the first communication session on the first radio frequency channel and indicates a future time at which the first radio frequency channel is to be clear of transmissions from the first communication system.

8. The computer-implemented method of claim 1, wherein the request to clear the first radio frequency channel of the communication traffic includes an identification of the second radio frequency channel.

9. An apparatus, comprising:
- a transceiver;
- a non-transitory storage medium; and
- a processor coupled to the transceiver and the non-transitory storage medium and configured to execute instructions stored in the non-transitory storage medium to cause the processor to:
  - transmit, via the transceiver, communication traffic on a shared radio frequency spectrum channel;
  - stop transmitting, via the transceiver, the communication traffic on the shared radio frequency spectrum channel in response to receiving, via the transceiver, a request to clear the shared radio frequency spectrum channel of communication traffic; and
  - transmit, via the transceiver, the communication traffic on a different radio frequency spectrum channel in response to receiving, via the transceiver, the request to clear the shared radio frequency spectrum channel of communication traffic.

10. The apparatus of claim 9, wherein the request to clear the shared radio frequency spectrum channel of communication traffic comprises a maintenance-busy command.

11. The apparatus of claim 9, wherein the processor is further configured to:
- stop transmitting, via the transceiver, the communication traffic on the different radio frequency spectrum channel in response to receiving, via the transceiver, an indication that the apparatus is permitted to again transmit on the shared radio frequency spectrum channel; and
- transmit, via the transceiver, the communication traffic on the shared radio frequency spectrum channel in response to receiving, via the transceiver, the indication that the apparatus is permitted to again transmit on the shared radio frequency spectrum channel.

12. The apparatus of claim 11, wherein the indication that the apparatus is permitted to again transmit on the shared radio frequency spectrum channel comprises a return-to-service command.

13. The apparatus of claim 9, wherein the indication that the apparatus is permitted to again transmit on the shared radio frequency spectrum channel comprises an indication of an early expiration of a period of time indicated in the request to clear the shared radio frequency spectrum channel of communication traffic.

14. The apparatus of claim 9, wherein the request to clear the shared radio frequency spectrum channel of communication traffic requests a portion of the shared radio frequency spectrum channel to be cleared.

15. A non-transitory computer readable storage medium configured to store computer executable instructions that when executed by a processor, cause the processor to:
- transmit to a secondary communication system that is transmitting communication traffic on a radio frequency channel shared with a primary communication system, a request for the secondary communication system to clear the radio frequency channel of at least part of the communication traffic to enable the primary communication system to transmit on the radio frequency channel, wherein transmitting the request for the secondary communication system to clear the radio frequency channel of at least part of the communication traffic to the secondary communication system causes the second communication system to handover the communication traffic from the radio frequency channel shared with the primary communication system to another radio frequency channel; and
- transmit to the secondary communication system, an indication that the secondary communication system is permitted to again transmit on the radio frequency channel shared with the primary communication system.

16. The non-transitory computer readable storage medium of claim 15, wherein transmitting the request for the secondary communication system to clear the radio frequency channel of the at least part of the communication traffic to the secondary communication system further causes the second communication system to:
- cease transmitting the at least part of the communication traffic on the radio frequency channel shared with the primary communication system; and
- begin transmitting the at least part of the communication traffic on the another radio frequency.

17. The non-transitory computer readable storage medium of claim 15, wherein the request for the secondary communication system to clear the radio frequency channel of the at least part of the communication traffic comprises at least one of a start time of a transmission of the primary communication system, an expected end time of the transmission of the primary communication system, a radio frequency channel to be used via the transmission of the primary communication system, and a location of a transceiver of the primary communication system.

18. The non-transitory computer readable storage medium of claim 15, wherein the request for the secondary communication system to clear the radio frequency channel of at least part of the communication traffic comprises a maintenance-busy command.

19. The non-transitory computer readable storage medium of claim 15, wherein the indication that the secondary communication system is permitted to again transmit on the radio frequency channel shared with the primary communication system comprises at least one of a return-to-service command and an early availability notification.

20. The non-transitory computer readable storage medium of claim 19, wherein the early availability notification indicates to the secondary communication system that the secondary communication system may transmit communication traffic on the radio frequency channel shared with the primary communication system prior to expiration of a period of time defined by the request for the secondary communication system to clear the radio frequency channel of at least part of the communication traffic.

* * * * *

UNITED STATES PATENT AND TRADEMARK OFFICE
CERTIFICATE OF CORRECTION

PATENT NO. : 9,572,042 B2
APPLICATION NO. : 14/992810
DATED : February 14, 2017
INVENTOR(S) : David Gwyn Steer et al.

It is certified that error appears in the above-identified patent and that said Letters Patent is hereby corrected as shown below:

On the Title Page

Item (72), Inventors replace “Gywn” with --Gwyn--.

In the Drawings

Delete Drawing Sheet 7, Fig. 8 and replace with the attached Drawing Sheet 7, Fig. 8.

In the Specification

Column 4, Line 22, replace “that that” with --that--; Line 26, replace “communication” with --first communication--; Lines 35 to 36, replace “the communication” with --the first communication--; Line 37, replace “the communication” with --the second communication--; Line 44, replace “the communication” with --the first communication--; Line 53, replace “the communication” with --the first communication--; Line 58, replace “The systems” with --The communication systems 102 and 106--.
Column 5, Line 29, replace “network” with --network connection--; Line 31, replace “104” with --106--.
Column 6, Line 2, replace “reuse channel” with --reuse spectrum channel--; Line 31, replace “the hole” with --the hole 302--; Line 51, replace “spectrum” with --spectrums--.
Column 7, Line 41, delete “410”.
Column 8, Line 38, replace “Communicator” with --Controller--; Line 51, replace “other” with --another--; Lines 57 to 58, replace “system operator communicator (SOC)” with --SOC--; Line 66, replace “shared channel” with --the shared channel--.
Column 9, Line 21, replace “RAM, ROM, DRAM, SRAM” with --Random Access Memory (RAM), Read Only Memory (ROM), Dynamic Random Access Memory (DRAM), Static Random Access Memory (SRAM)--; Lines 23, 24, 30, 31, 34, and 39, delete “computer”; Line 47, replace “shared channel.” with --the shared channel.--; Line 56, replace “614” with --714--.

Signed and Sealed this
Twenty-second Day of May, 2018

Andrei Iancu
*Director of the United States Patent and Trademark Office*

Column 10, Line 32, replace “EDGE” with --Enhanced Data rates for GSM Evolution (EDGE)--; Line 39, replace “random access memory (RAM)” with --RAM--; Line 48, replace “network” with --wireless network--; Line 56, replace “300” with --800--; Line 59, replace “SIM card or RUIM” with --SIM card/RUIM--.
Column 11, Line 23, replace “308” with --808--; Line 24, replace “read only memory (ROM)” with --ROM--; Line 56, replace “300” with --800--; Line 66, replace “806” with --808--.
Column 12, Line 25, replace “mobile” with --wireless--; Lines 38 to 39, replace “operations administration and management (OAM)” with --OAM--; Line 44, delete “device”; Lines 45 to 46, replace “communications sub-systems” with --communication sub-system--; Line 46, replace “device” with --user equipment--; Line 47, replace “communications” with --wireless--.
Column 13, Line 13, replace “management” with --sharing--.
Column 14, Line 49, replace “NAS” with --Non-Access Stratum (NAS)--.
Column 15, Line 15, delete “of”.
Column 16, Line 17, delete “of the”.
Column 18, Line 49, replace “application” with --application 1004--.
Column 19, Line 37, replace “applications” with --applications 1104 and 1106--; Line 40, replace “system” with --network--; Line 42, replace “a channel” with --an alternate network channel--; Lines 48, 51, and 58, replace “co-system” with --co-system network--.
Column 20, Line 12, replace “co-sytem” with --co-system network--; Line 26, replace “alternate” with --alternate network--; Line 42, replace “co-system” with --co-system network--.